US012106278B2

(12) United States Patent
Chen et al.

(10) Patent No.: US 12,106,278 B2
(45) Date of Patent: *Oct. 1, 2024

(54) RULES ENGINE FOR COMMUNICATION ROUND TRIPS OPTIMIZATION OF KERNEL-IN-CLOUD PAYMENT TRANSACTION

(71) Applicant: Visa International Service Association, San Francisco, CA (US)

(72) Inventors: Yuexi Chen, Foster City, CA (US); Marc Kekicheff, Foster City, CA (US); Philippe Martin, San Jose, CA (US)

(73) Assignee: Visa International Service Association

( * ) Notice: Subject to any disclaimer, the term of this patent is extended or adjusted under 35 U.S.C. 154(b) by 0 days.

This patent is subject to a terminal disclaimer.

(21) Appl. No.: 18/175,084

(22) Filed: Feb. 27, 2023

(65) Prior Publication Data

US 2023/0222475 A1  Jul. 13, 2023

Related U.S. Application Data

(63) Continuation of application No. 16/980,071, filed as application No. PCT/US2019/021652 on Mar. 11, 2019, now Pat. No. 11,625,702.

(Continued)

(51) Int. Cl.
  *G06Q 20/00*    (2012.01)
  *G06N 5/025*    (2023.01)
  (Continued)

(52) U.S. Cl.
  CPC ........... *G06Q 20/202* (2013.01); *G06N 5/025* (2013.01); *G06Q 20/209* (2013.01);
  (Continued)

(58) Field of Classification Search
  CPC .. G06Q 30/087; G06Q 20/202; G06Q 20/209; G06Q 20/321; G06N 5/025
  See application file for complete search history.

(56) References Cited

U.S. PATENT DOCUMENTS 8,412,631 B2   4/2013   Crofts et al.
9,595,061 B1   3/2017   Ryan
(Continued)

FOREIGN PATENT DOCUMENTS

CN   104158882 B   9/2017

OTHER PUBLICATIONS

U.S. Appl. No. 16/980,071, Non-Final Office Action, Mailed on Jun. 9, 2022, 8 pages.
(Continued)

*Primary Examiner* — Rokib Masud
(74) *Attorney, Agent, or Firm* — Kilpatrick Townsend & Stockton LLP

(57) ABSTRACT

A thin client may be utilized to facilitate data exchanges between two devices (e.g., a remote computer and a portable device). In some embodiments, the two devices may utilize differing communications protocols. The thin client may further be configured with a rules engine that determines one or more actions to be performed in response to one or more stimuli. The thin client may manage the processing flow between the two devices according to one or more predefined rules that are interpretable by the rules engine. The rules may be pushed to the thin client via any suitable device enabling the functionality of the thin client to be configured and/or modified without having to update the hardware and/or software of the thin client.

20 Claims, 10 Drawing Sheets

Related U.S. Application Data

(60) Provisional application No. 62/717,477, filed on Aug. 10, 2018, provisional application No. 62/641,712, filed on Mar. 12, 2018.

(51) Int. Cl.
   *G06Q 20/20* (2012.01)
   *G06Q 20/32* (2012.01)
   *G06Q 20/40* (2012.01)

(52) U.S. Cl.
   CPC ......... *G06Q 20/321* (2020.05); *G06Q 20/326* (2020.05); *G06Q 20/401* (2013.01)

(56) References Cited

U.S. PATENT DOCUMENTS

| | | | |
|---|---|---|---|
| 10,588,016 | B2 | 3/2020 | Chen et al. |
| 2008/0263641 | A1 | 10/2008 | Dinh et al. |
| 2012/0271764 | A1 | 10/2012 | Chen |
| 2013/0179346 | A1 | 7/2013 | Kumnick et al. |
| 2013/0282566 | A1* | 10/2013 | Davis ................ G06Q 20/023 705/39 |
| 2014/0046847 | A1* | 2/2014 | Jacobs ................ G06Q 20/405 705/44 |
| 2014/0164228 | A1 | 6/2014 | Pathak |
| 2015/0120878 | A1 | 4/2015 | Horgan et al. |

OTHER PUBLICATIONS

U.S. Appl. No. 16/980,071, Notice of Allowance, Mailed on Dec. 19, 2022, 9 pages.

Application No. NG/PT/C/2020/4875, Notice of Allowance, Mailed on Feb. 26, 2021, 2 pages.

Application No. PCT/US2019/021652, International Preliminary Report on Patentability, Mailed on Sep. 24, 2020, 6 pages.

Application No. PCT/US2019/021652, International Search Report and Written Opinion, Mailed on Jun. 26, 2019, 9 pages.

AU2019234488, "First Examination Report", Oct. 30, 2023, 3 pages.

AU2019234488, "Second Examination Report", Feb. 22, 2024, 3 pages.

Third Examination Report, dated Jun. 11, 2024, for Australian Patent App. No. AU2019234488, 3 pages.

* cited by examiner

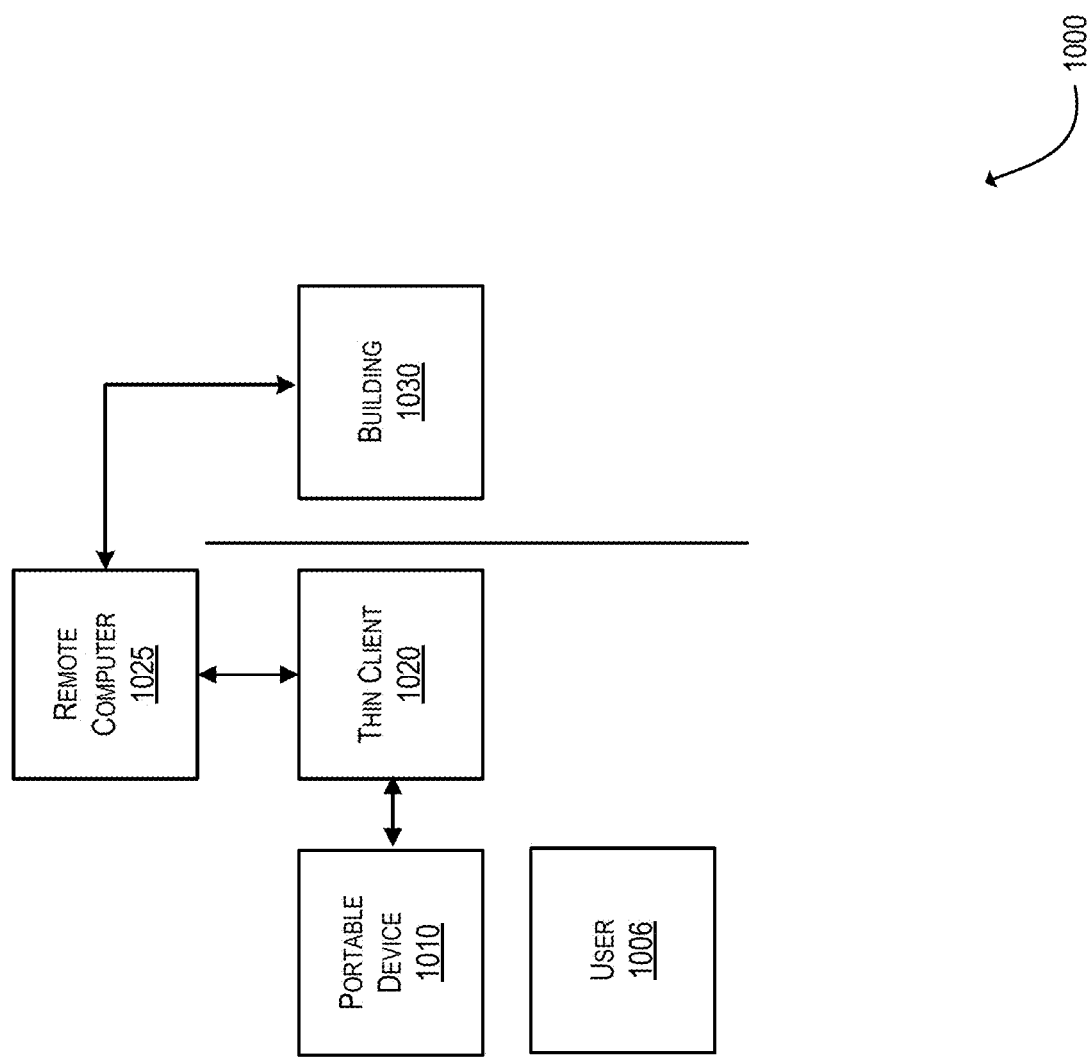

RULES ENGINE FOR COMMUNICATION ROUND TRIPS OPTIMIZATION OF KERNEL-IN-CLOUD PAYMENT TRANSACTION

CROSS-REFERENCE TO RELATED APPLICATIONS

This application is a continuation of U.S. patent application Ser. No. 16/980,071, filed Sep. 11, 2020, which is a 371 National Phase of PCT Patent Application No. PCT/US2019/021652, filed Mar. 11, 2019, and claims priority to U.S. Provisional Patent Application No. 62/717,477, filed on Aug. 10, 2018 and U.S. Provisional Patent Application No. 62/641,712, filed on Mar. 12, 2018, the disclosures of which are herein incorporated by reference in their entirety for all purposes.

BACKGROUND

Remote computers may communicate with portable devices via an intermediary computer. There are many rounds of communications between the remote computer and the portable device. For networks that have high latency (e.g., greater than 200 ms) such as 2G mobile communication networks (GSM, GPRS, EDGE, CDMA2000) or dial up modems, many communication round trips will cause large time delays.

Embodiments of the invention address these and other problems individually and collectively.

BRIEF SUMMARY

One embodiment of the invention is directed to a method comprising: receiving, by a processor in a thin client from a remote computer, a first transaction message; transmitting, by the thin client to a portable device, a second transaction message; receiving, by the thin client from the portable device, a third transaction message; identifying, by a rules engine executing on the thin client, an action based at least in part on receipt of the third transaction message; transmitting, by the thin client, a fourth transaction message to the portable device without communicating with the remote computer, the fourth transaction message being transmitted in accordance with the action identified; receiving, by the thin client, a fifth transaction message from the portable device; and transmitting, by the thin client, the fifth transaction message to the remote computer.

Another embodiment of the invention is directed to a thin client programmed to perform the above-noted method.

Further details regarding embodiments of the invention can be found in the Detailed Description and the Figures.

BRIEF DESCRIPTION OF THE DRAWINGS

FIG. 10 shows a block diagram illustrating a building access system.

DETAILED DESCRIPTION

Figure 1:
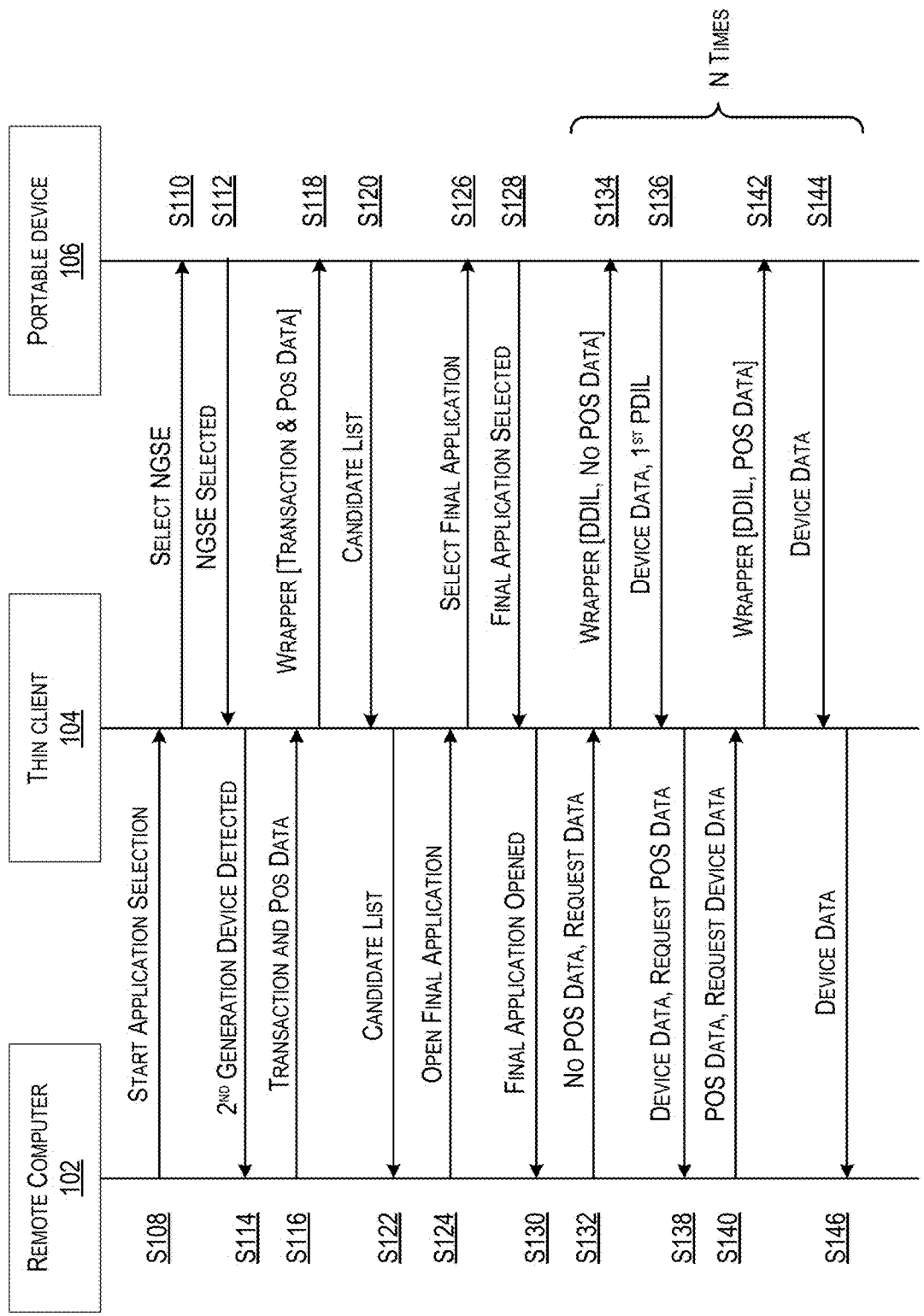
FIG. 1 shows a block diagram of a system and method for performing a transaction in accordance with at least one embodiment.

Prior to discussing embodiments of the invention, some terms can be described in further detail.

A "portable device" may comprise any suitable device that may be carried by a user. Examples of portable devices may include mobile communication devices (e.g., mobile phones), payment devices (e.g., credit cards, debit cards, etc.), user access devices such as access badges, etc. A portable device can store sensitive information such as payment credentials (e.g., primary account numbers, tokens, expiration dates, etc.), and access credentials.

A "payment device" may include any suitable device that may be used to conduct a financial transaction, such as to provide payment credentials to a merchant. Suitable payment devices can be hand-held and compact so that they can fit into a user's wallet and/or pocket (e.g., pocket-sized). Example payment devices may include smart cards, keychain devices (such as the Speedpass™ commercially available from Exxon-Mobil Corp.), etc. Other examples of payment devices include payment cards, smart media, transponders, and the like. If the payment device is in the form of a debit, credit, or smartcard, the payment device may also optionally have features such as magnetic stripes. Such devices can operate in either a contact or contactless mode.

A "mobile communication device" may be an example of a "communication device" that can be easily transported. Examples of remote communication capabilities include using a mobile phone (wireless) network, wireless data network (e.g. 3G, 4G or similar networks), Wi-Fi, Wi-Max, or any other communication medium that may provide access to a network such as the Internet or a private network. Examples of mobile communication devices include mobile phones (e.g. cellular phones), PDAs, tablet computers, net books, laptop computers, personal music players, hand-held specialized readers, etc. Further examples of mobile communication devices include wearable devices, such as smart watches, fitness bands, ankle bracelets, rings, earrings, etc., as well as automobiles with remote communication capabilities. In some embodiments, a mobile communication device can function as a payment device (e.g., a mobile communication device can store and be able to transmit payment credentials for a transaction). Mobile communication devices may also include vehicles such as cars that have remote communication capabilities.

A "credential" may be any suitable information that serves as reliable evidence of worth, ownership, identity, or authority. A credential may be a string of numbers, letters, or any other suitable characters, as well as any object or document that can serve as confirmation.

"Payment credentials" may include any suitable information associated with an account (e.g. a payment account and/or payment device associated with the account). Such information may be directly related to the account or may be derived from information related to the account. Examples of account information may include a PAN (primary account number or "account number"), user name, expiration date, and verification values such as CVV, dCVV, CVV2, dCVV2, and CVC3 values.

A "token" may be a substitute value for a credential. A token may be a string of numbers, letters, or any other suitable characters. Examples of tokens include payment tokens, access tokens, personal identification tokens, etc.

A "payment token" may include an identifier for a payment account that is a substitute for an account identifier, such as a primary account number (PAN). For example, a payment token may include a series of alphanumeric characters that may be used as a substitute for an original account identifier. For example, a token "4900 0000 0000 0001" may be used in place of a PAN "4147 0900 0000 1234." In some embodiments, a payment token may be "format preserving" and may have a numeric format that conforms to the account identifiers used in existing transaction processing networks (e.g., ISO 8583 financial transaction message format). In some embodiments, a payment token may be used in place of a PAN to initiate, authorize, settle or resolve a payment transaction or represent the original credential in other systems where the original credential would typically be provided. In some embodiments, a payment token may be generated such that the recovery of the original PAN or other account identifier from the token value may not be computationally derived. Further, in some embodiments, the token format may be configured to allow the entity receiving the token to identify it as a token and recognize the entity that issued the token.

A "user" may include an individual. In some embodiments, a user may be associated with one or more personal accounts and/or mobile devices. The user may also be referred to as a cardholder, account holder, or consumer in some embodiments.

A "resource provider" may be an entity that can provide a resource such as goods, services, information, and/or locations. Examples of resource providers includes merchants, data providers, transit agencies, governmental entities, venue and dwelling operators, etc.

A "merchant" may typically be an entity that engages in transactions and can sell goods or services, or provide access to goods or services.

An "acquirer" may typically be a business entity (e.g., a commercial bank) that has a business relationship with a particular merchant or other entity. Some entities can perform both issuer and acquirer functions. Some embodiments may encompass such single entity issuer-acquirers. An acquirer may operate an acquirer computer, which can also be generically referred to as a "transport computer".

An "authorizing entity" may be an entity that authorizes a request. Examples of an authorizing entity may be an issuer, a governmental agency, a document repository, an access administrator, etc. An authorizing entity may operate an authorization computer.

An "issuer" may typically refer to a business entity (e.g., a bank) that maintains an account for a user. An issuer may also issue payment credentials stored on a portable device, such as a cellular telephone, smart card, tablet, or laptop to the consumer.

An "access device" may be any suitable device that provides access to a remote system. An access device may also be used for communicating with a merchant computer, a transaction processing computer, an authentication computer, or any other suitable system. An access device may generally be located in any suitable location, such as at the location of a merchant. An access device may be in any suitable form. Some examples of access devices include point of sale devices (e.g., POS terminals), cellular phones, PDAs, personal computers (PCs), tablet PCs, hand-held specialized readers, set-top boxes, electronic cash registers (ECRs), automated teller machines (ATMs), virtual cash registers (VCRs), kiosks, security systems, access systems, and the like. An access device may use any suitable contact or contactless mode of operation to send or receive data from, or associated with, a mobile communication or payment device. In some embodiments, where an access device may comprise a POS terminal, any suitable POS terminal may be used and may include a reader, a processor, and a computer-readable medium. A reader may include any suitable contact or contactless mode of operation. For example, exemplary card readers can include radio frequency (RF) antennas, optical scanners, bar code readers, or magnetic stripe readers to interact with a payment device and/or mobile device. In some embodiments, a cellular phone, tablet, or other dedicated wireless device used as a POS terminal may be referred to as a mobile point of sale or an "mPOS" terminal.

A "remote computer" may include a device that is remote with respect to an access device (or thin client). In some embodiments, a remote computer may be a server computer configured to perform Point-of-Sale (POS) terminal functionality (EMV® technology) for transactions (e.g., payment transactions). A remote computer may also be referred to as a software defined point of sale (POS) and/or a "cloud POS".

A "thin client" may refer to a type of access device. The thin client may be configured to perform limited functionality to facilitate transactions between a portable device and a remote computer. A thin client may interface with a variety of devices/components such as a user interface (e.g., a display, a card reader, etc.), a portable device, and/or a verification entry device (e.g., a pin pad, a biometric reader, etc.). In some embodiments, the thin client maintains the processing flow context and coordinates the processing flow between the remote computer (e.g., the cloud POS) and the local interfaces such as user interface(s), the portable device, and/or the verification entry device(s). In some embodiments, the thin client may be capable of communicating using different communication protocols. When receiving, from a portable device, communications under a communication protocol that is incompatible with a remote computer, the thin client may convert the received communications to be compatible with the remote computer and forward the converted communications. Likewise, when receiving communications from the remote computer, the thin client may convert the communications to a communication protocol that is incompatible with the remote computer (e.g., a communications protocol associated with the portable device) before forwarding the converted communication to the portable device. Generally, a thin client may perform any suitable operations for facilitating data communications between a portable device and a remote computer.

A "rules engine" may be a module that is configured to interpret and implement a set of rules. In some embodiments, a thin client may execute a rules engine. The rules engine may process chaining messages/events from/to the remote computer and/or the portable device. In some embodiments, the rules engine may make limited local decisions based on rules provided by the remote computer or any other suitable device. One or more sets of rules (e.g., rules defined in a markup language such as XML and/or JSON, one or more executable scripts, etc.) may be transmitted from the remote computer to the thin client and stored for later use by the rules engine. Through this transmission, the thin client may be configured to implement the one or more sets of rules utilizing the rules engine. In some embodiments, the rules engine may be configured to enforce one or more rules by executing one or more scripts.

An "authorization request message" may be an electronic message that requests authorization for a transaction. In some embodiments, it is sent to a transaction processing computer and/or an issuer of a payment card to request authorization for a transaction. An authorization request message according to some embodiments may comply with ISO 8583, which is a standard for systems that exchange electronic transaction information associated with a payment made by a user using a payment device or payment account. The authorization request message may include an issuer account identifier that may be associated with a payment device or payment account. An authorization request message may also comprise additional data elements corresponding to "identification information" including, by way of example only: a service code, a CVV (card verification value), a dCVV (dynamic card verification value), a PAN (primary account number or "account number"), a payment token, a user name, an expiration date, etc. An authorization request message may also comprise "transaction information," such as any information associated with a current transaction, such as the transaction amount, merchant identifier, merchant location, acquirer bank identification number (BIN), card acceptor ID, information identifying items being purchased, etc., as well as any other information that may be utilized in determining whether to identify and/or authorize a transaction.

An "authorization response message" may be a message that responds to an authorization request. In some cases, it may be an electronic message reply to an authorization request message generated by an issuing financial institution or a transaction processing computer. The authorization response message may include, by way of example only, one or more of the following status indicators: Approval—transaction was approved; Decline—transaction was not approved; or Call Center—response pending more information, merchant must call the toll-free authorization phone number. The authorization response message may also include an authorization code, which may be a code that a credit card issuing bank returns in response to an authorization request message in an electronic message (either directly or through the transaction processing computer) to the merchant's access device (e.g. PA equipment) that indicates approval of the transaction. The code may serve as proof of authorization.

A "server computer" may include a powerful computer or cluster of computers. For example, the server computer can be a large mainframe, a minicomputer cluster, or a group of servers functioning as a unit. In one example, the server computer may be a database server coupled to a Web server. The server computer may be coupled to a database and may include any hardware, software, other logic, or combination of the preceding for servicing the requests from one or more client computers. The server computer may comprise one or more computational apparatuses and may use any of a variety of computing structures, arrangements, and compilations for servicing the requests from one or more client computers.

A "processor" may refer to any suitable data computation device or devices. A processor may comprise one or more microprocessors working together to accomplish a desired function. The processor may include a CPU comprising at least one high-speed data processor adequate to execute program components for executing user and/or system-generated requests. The CPU may be a microprocessor such as AMD's Athlon, Duron and/or Opteron; IBM and/or Motorola's PowerPC; IBM's and Sony's Cell processor; Intel's Celeron, Itanium, Pentium, Xeon, and/or XScale; and/or the like processor(s).

A "memory" may be any suitable device or devices that can store electronic data. A suitable memory may comprise a non-transitory computer readable medium that stores instructions that can be executed by a processor to implement a desired method. Examples of memories may comprise one or more memory chips, disk drives, etc. Such memories may operate using any suitable electrical, optical, and/or magnetic mode of operation.

Embodiments discussed herein are directed to optimizing the functionality of the thin client utilizing a rules engine. In some embodiments, the thin client executes a rules engine with which a transaction processing flow can be simplified. The rules engine may be configured with a set of rules which define one or more actions to be performed in response to a given stimulus. By way of example a rule may define an action (e.g., transmit one or more particular messages to a particular device, execute one or more scripts, etc.) is to be performed based on a stimulus such as receiving a particular type of message, receiving a particular type of message having a particular data field of a particular value, or the like. Although examples herein utilize a single rules engine, it should be appreciated that multiple rules engines may be utilized where each rules engine is configured to address specific portions of the transaction processing flow. Utilizing the features of the rules engine discussed herein may result in fewer message exchanges between the remote computer, thin client, and/or the portable device, thus the processing flow may be simplified and the processing burden of performing the transaction reduced.

FIG. 1 shows a system 100 and method for performing a transaction, in accordance with at least one embodiment. System 100 may comprise a number of components according to an embodiment of the invention. The system 100 comprises a remote computer 102, a thin client 104, and a portable device 106. The portable device 106 and the thin client 104 may be in local communication (e.g., via a local area network, via near-field communication, via Bluetooth®, via direct contact, etc.). The thin client 104 and the remote computer 102 may be in remote communication (e.g., via the Internet). FIG. 1 illustrates an example in which data may be exchanged between a remote computer 102 performing software defined point of sale functionality (e.g., in the cloud, a "cloud POS") and a portable device 106 (e.g., a second generation EMV card). The method illustrated in FIG. 1 may correspond to a protocol that does not implement the rules engine described herein.

For simplicity of illustration, a certain number of components are shown in FIG. 1. It is understood, however, that embodiments of the invention may include more than one of each component.

The portable device 106 may be operated by a user. The portable device 106 may be of a second portable device type. For example, the portable device 106 of the second portable device type may be a second generation EMV card. Whereas, a portable device of a first portable device type may be a first generation EMV card.

The thin client 104 may exchange communications with the portable device 106. In some embodiments, the thin client 104 may enable the portable device 106 to exchange data (e.g., transaction information, terminal data, etc.) with the remote computer 102 during a transaction. In some embodiments, the thin client 104 may forward data received from the portable device 106 to the remote computer 102 and vice versa. In some embodiments, the thin client 104 may be an access device operated by a merchant. In some embodiments, the thin client 104 may be configured to convert data corresponding to a first communications protocol (e.g., EMV 1.0 protocol) to data corresponding to a second communications protocol (e.g., EMV 2.0 protocol) and vice versa. It should be appreciated that the use of "first" and "second," as used herein, is utilized to denote a difference and not necessarily an order.

The remote computer 102 may be configured to communicate with the thin client 104. In some embodiments, the remote computer 102 may provide a payment acceptance service in a cloud computing environment. For example, the remote computer 102 may be a server computer configured to perform Point-of-Sale (POS) terminal functionality (EMV® technology) for transactions (e.g., payment transactions). A remote computer may also be referred to as a software defined point of sale (POS) and/or a "cloud POS".

The steps discussed below in connection with FIG. 1, may be directed to a transaction between the components of FIG. 1. In the example depicted, both the remote computer 102 and the portable device 106 may be configured to communicate utilizing the EMV 2.0 protocol.

Before step S108, the portable device 106 may initiate a transaction with the remote computer 102. By way of example, the portable device 106 may be a debit and/or credit card that is swiped and/or tapped at a reader of the thin client 104. As another example, the transaction may be initiated by the thin client 104 itself or by another device operated by or on behalf of a merchant. In some embodiments, the thin client 104 may notify the remote computer 102 that a transaction has been initiated. At step S108, the remote computer 102 may transmit a communication (e.g., as a first transaction message) to the thin client 104 to start the selection of an application with which to perform the transaction.

At step S110, the thin client 104 may forward the communication received in step S108 to the portable device 106 as a "select NGSE" request (e.g., as a second transaction message). NGSE may stand for "next generation systems environment, and may correspond to an environment that operates using a second portable device type. This can be contrasted with a legacy card operating environment, which may correspond to an operating environment for a first portable device type. In some embodiments, the select NGSE request may request the portable device 106 to provide information regarding the portable device type to the thin client.

At step S112, the thin client 104 may receive a communication (e.g., as a third transaction message) confirming that the portable device 106 is of a second portable device type. At step S114, the thin client 104 may forward the confirmation (e.g., as a fourth transaction message) that the portable device 106 is of the second portable device type to the remote computer 102.

At step S116, after receiving the confirmation that the portable device 106 is of the second portable device type, the remote computer 102 may transmit transaction and POS data (e.g., in a fifth transaction message) to the thin client 104.

At step S118, after receiving the transaction and POS data, the thin client 104 may wrap the transaction and POS data using a wrapper. The thin client 104 may then transmit the wrapped transaction and POS data to the portable device 106 (e.g., in a sixth transaction message).

At step S120, the thin client 104 may receive a candidate list from the portable device 106 (e.g., in a seventh transaction message). In some embodiments, the portable device 106 may provide the candidate list to the thin client 104 in response to receiving the wrapped transaction and POS data.

At step S122, after receiving the candidate list, the thin client 104 may transmit the candidate list to the remote computer 102 (e.g., in an eighth transaction message).

At step S124, the remote computer 102 may transmit (e.g., in a ninth transaction message) a request to open a final application. At step S126, the thin client 104, may transmit (e.g., in a tenth transaction message) to the portable device 106, a request to select the final application.

At step S128, the portable device 106 may transmit (e.g., in an eleventh transaction message) a final application selection. At step S130, the thin client 104, may transmit to the remote computer 102 (e.g., in a twelfth transaction message) an indication that the selected final application was opened.

Additional steps S132 to S146 are shown in FIG. 1. Further details regarding these steps can be found in U.S. patent application Ser. No. 15/631,716, filed on Jun. 23, 2017, which is herein incorporated by reference in its entirety for all purposes. A copy of this application is attached as an Appendix to this application. These steps are directed to a number of data exchanges between the remote computer 102 and the portable device 106 that are assisted by the thin client 104. To conduct a transaction, the remote computer 102 and the portable device 106 may seek to obtain transaction information from each other. For example, the portable device 106 may seek to obtain POS data such as what sort of card verification methods are supported by the remote computer 102. The remote computer may seek to obtain portable device data (e.g., the primary account number (PAN), expiration date, country code, and other account information) associated with portable device 106.

It should be appreciated that because EMV 2.0 is a data driven communication protocol, different combinations of portable device data or POS data can be requested or provided in a single communication. In particular, a single communication may both request data and provide data in response to an earlier request. For example, a communication from the remote computer 102 to the portable device 106 (via the thin client 104) may both include a request for portable device data as well as POS data that is responsive to a POS data request made by the portable device 106. This ability to mix and match data and data requests in a single communication may reduce the total number of communications exchanged, which may increase the speed and reduce the complexity of processing the transaction. It should be noted that steps S132-S146 may be repeated a number of times depending on the transaction information that needs to be exchanged.

At step S132, the thin client 104 may receive, from the remote computer 102, a communication (e.g., a thirteenth transaction message) that requests portable device data (e.g., transaction data such as amount, payment account number, expiration date, etc.) from the portable device 106. As depicted, the request may not include POS data. However, in alternate embodiments, the request may additionally include POS data. In some embodiments, the remote computer 102 provides to the thin client 104 all of the POS data that is available at that stage. In some embodiments, the remote computer 102 may wrap the portable data request in a list of data objects (e.g., indicated using a device data identifier list (DDIL)) requested from the portable device 106.

At step S134, the thin client 104 may forward (e.g., in a fourteenth transaction message) the portable device data request (and in some cases the POS data) to the portable device 106. In some embodiments, the thin client 104 may wrap the portable data request in a list of data objects (e.g., indicated using a device data identifier list (DDIL)) requested from the portable device 106.

At step S136, the thin client 104 may receive another communication (e.g., a fifteenth transaction message) from the portable device 106 that contains the portable device data requested in the previous step. In some embodiments, the portable device 106 may provide only the set of portable device data that were requested in the previous step. In other embodiments, the portable device 106 may provide all portable device data available at that time. In some embodiments, this communication may further request for POS data. In some embodiments, the portable device 106 may wrap the POS data request in a list of data objects (e.g., indicated using a POS data identifiers list (PDIL)) requested from the remote computer 304.

At step S138, the thin client 104 may transmit a communication (e.g., a sixteenth transaction message) to the remote computer 102 that contains the device data requested and the request for POS data.

At step S140, the thin client 104 may receive, from the remote computer 102, a communication (e.g., a seventeenth transaction message) that provides the POS data requested in the previous step. In some embodiments, the communication may further include an additional request for portable device data. In some embodiments, the remote computer 102 may wrap this portable data request in a list of data objects (e.g., indicated using a device data identifier list (DDIL)) requested from the portable device 106.

At step S142, the thin client 104 may forward (e.g., in a eighteenth transaction message) the POS data (and in some cases the portable device data request) to the portable device 106. In some embodiments, the thin client 104 may wrap the portable data request in a list of data objects (e.g., indicated using a device data identifier list (DDIL)) requested from the portable device 106.

At step S144, the thin client 104 may receive another communication (e.g., a nineteenth transaction message) from the portable device 106 that contains the portable device data requested in the previous step. In some embodiments, the portable device 106 may provide only the set of portable device data that was requested in the previous step. In other embodiments, the portable device 106 may provide all portable device data available at that time.

At step S146, the thin client 104 may transmit a communication (e.g., a twentieth transaction message) to the remote computer 102 that contains the portable device data requested.

Figure 2:
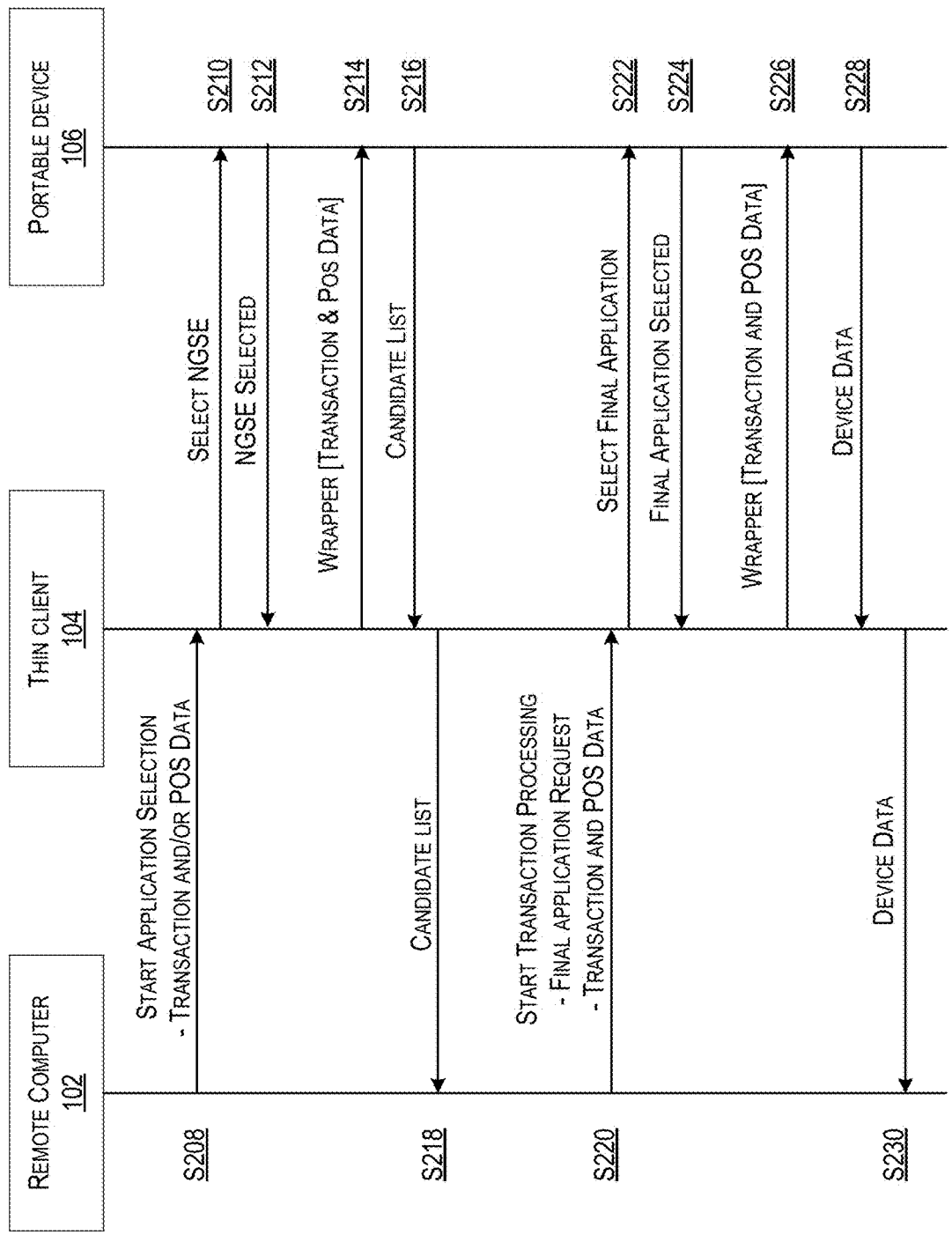
FIG. 2 shows an optimized method for performing a transaction utilizing a rules engine, in accordance with at least one embodiment.

FIG. 2 shows an optimized method 200 for performing a transaction in accordance with at least one embodiments. The method 200 is intended to illustrate a data exchange between the remote computer 102 and the portable device 106 of FIG. 1 utilizing a rules engine operating on the thin client 104. By comparison, utilizing the rules engine in the manner described in FIG. 2 may reduce the number of interactions between remote computer 102 and the thin client 104. By way of example, rather than interacting ten times as described in FIG. 1, the remote computer 102 and thin client 104 may only interact four times based at least in part on the utilization of the rules engine as discussed herein. Although the steps are illustrated in a specific order, it is understood that embodiments of the invention may include methods that have the steps in different orders. In addition, steps may be omitted or added and may still be within embodiments of the invention.

In some embodiments, a rules engine may execute on the thin client 104. The rules engine may process chaining messages and chaining events from and to the remote computer 102. In some embodiments, the rules engine may make limited local decisions based on the rules fetched from the remote computer 102 or any other suitable device. In other embodiments, rules may be transmitted from the remote computer 102 (or any suitable computing device) to the rules engine executing on the thin client 104. The rules may be a module that is configured to interpret and implement the rules provided by the remote computer (or any suitable computing device). One or more sets of rules (e.g., rules defined in a markup language such as XML and/or JSON, one or more executable scripts, etc.) may be transmitted from the remote computer 102 to the thin client and stored for later use by the rules engine. Through this transmission, the thin client 104 may be configured to implement the one or more sets of rules utilizing the rules engine. In some embodiments, the rules engine may be configured to enforce and/or implement one or more rules by executing one or more scripts.

At step S208, the remote computer 102 may transmit a communication to the thin client 104 to start the selection of an application with which to perform the transaction. In some embodiments, this communication may include transaction and/or POS data. The rules engine executing on the thin client 104 may identify that the POS data should be stored for later use and that a select NGSE message should be transmitted to the portable device 106. In some embodiments, the remote computer 102 may push (e.g., transmit) rules to the thin client 104, before, concurrently, or after step S208. For example, the remote computer 102 may push a rule regarding transaction and POS data.

At step S210, after receiving the communication, the thin client 104 may transmit a select NGSE request to the portable device 106 in accordance with the predefined rule implemented by the rules engine. In some embodiments, the portable device 106 may perform processing based on the select NGSE request. The portable device 106 may generate and transmit a selected NGSE response to the thin client 104 at S212.

At step S214, the thin client 104 may receive the selected NGSE response from the portable device 106. The thin client 104 (e.g., the rules engine) may determine that the transaction and/or POS data received at S208 is to be wrapped and then transmitted to the portable device 106 based on a rule. For example, the rule may indicate that the transaction and/or POS data is to be wrapped and then transmitted to a portable device after receiving a selected NGSE response. In some embodiments, the thin client 104 may use the rules engine to process the rule. In other embodiments, the thin client 104 may not transmit a message to the remote computer 102 as in step S114 of FIG. 1. Thus, additional communications discussed in connection with S114 and S116 of FIG. 1 are unnecessary.

At step S214, after receiving the transaction and POS data, the thin client 104 may wrap the transaction and POS data using a wrapper. The thin client 104 may then transmit the wrapped transaction and POS data to the portable device 106.

At step S216, the thin client 104 may receive a candidate list from the portable device 106. In some embodiments, the portable device 106 may provide the candidate list to the thin client 104 in response to receiving the wrapped transaction and POS data.

At step S218, after receiving the candidate list, the thin client 104 may transmit the candidate list to the remote computer 102.

At step S220, in response to receiving the candidate list, the remote computer 102 may transmit a request to open a final application. In some embodiments, the request may include transaction and/or POS data to be provided to the portable device 106.

At step S222, the rules engine executing on the thin client 104 may determine (e.g., from a predefined rule) that data received in a request to open a final application is to be stored for later use and that the request to open the final application is to be forwarded to the portable device. Accordingly, the thin client 104 may store the transaction and/or POS data and may transmit to the portable device 106, the request to select the final application.

At step S224, the thin client 104 may receive, from the portable device 106, an indication of the final application selected. The rules engine executing on the thin client 104 may determine (e.g., from a predefined rule) that, in response to receiving the indication of the final application selected, the transaction and/or POS data is to be wrapped and then transmitted to the portable device 106. Accordingly, the thin client 104 may wrap the transaction and/or POS data and transmit the wrapped data to the portable device 106.

At step S228, the thin client 104 may receive, from the portable device 106, portable device data. The rules engine executing on the thin client 104 may determine (e.g., from a predefined rule) that, in response to receiving portable device data, the portable device data is to be transmitted to the remote computer 102. Accordingly, the thin client 104 may transmit the portable device data to the remote computer 102 at step S230.

Figure 3:
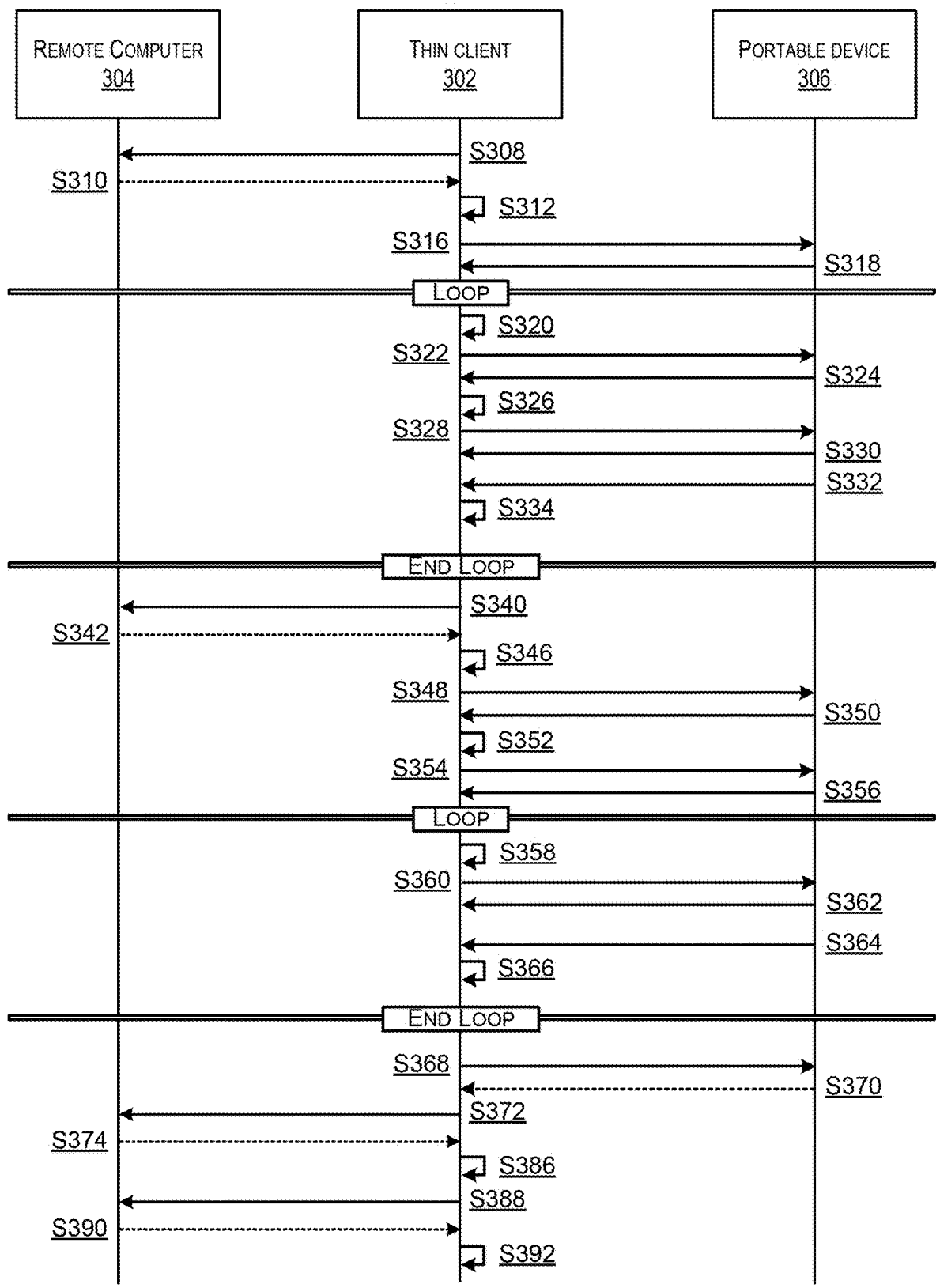
FIG. 3 shows another method for performing a transaction utilizing a rules engine, in accordance with at least on embodiment.

FIG. 3 shows another method 300 for performing a transaction utilizing a rules engine, in accordance with at least on embodiment. The method 300 may be performed by a thin client (TC) 302, a remote computer 304, and a portable device 306. The TC 302 and the portable device 306 may be in local communication (e.g., in direct contact, wired contact, via a local area network, via NFC and/or Bluetooth®, etc.). The TC 302 and the remote computer 304 may be in remote communication (e.g., via a wide area network, via the Internet, etc.). The TC 302 may be an example of the thin client 104 of FIG. 1. The remote computer 304 may be an example of the remote computer 102 of FIG. 1. The portable device 306 may be an example of the portable device 106 of FIG. 1. FIG. 3 is intended to illustrate an embodiment in which a rules engine operating on the thin client 302 may manage the processing flow between the remote computer 304 and the portable device 306 to exchange data between the remote computer 304 and the portable device 306 via the thin client 304.

The TC 302 may include the rules engine, as described above. The rules engine may determine what functions (e.g., what actions) the TC 302 may perform at certain times, or after receiving certain data and/or messages.

Before step S308, the portable device 306 and the TC 302 may interact. For example, a user of the portable device 306 (e.g., a debit card) may initiate a transaction with the TC 302 using the portable device 306 (e.g., by swiping and/or tapping the card at a reader in communication with the TC 302).

At step S308, the TC 302 may generate and transmit a "Begin_Transaction" message to the remote computer 304. At this point, the remote computer 304 may be determining what applications are available on the portable device 306 with which to perform the transaction.

At step S310, after receiving the "Begin_Transaction" message, the remote computer 304 may transmit a response to the "Begin_Transaction" message to the TC 302. The response may be an "Open_And_Send" command. Utilizing this response, the remote computer 304 may communicate to the TC 302 that a directory selection is requested. In some embodiments, the remote computer 304 may transmit data elements necessary for the transaction to the TC 302 as part of the response.

At step S312, the TC 302 may use the rules engine to determine an action to be performed based on predefined rules. In this case, the rules engine may determine from the predefined rules that when the TC 302 receives the "Open_And_Send" command from the remote computer 304, the TC should generate and send a "Select_PSE" command to the portable device 306.

At step S316, the TC 302 may transmit a "Select_PSE" command to the portable device 306 in accordance with the determination of the rules engine. In some embodiments, the "Select_PSE" command may be utilized to enable the TC 302 to determine the payment environment in which the portable device 306 operates.

At step S318, after receiving the "Select_PSE" command, the portable device 306 may transmit a response to the "Select_PSE" command. In some embodiments, the response may be "Not Present," indicating that the transaction is a card not present transaction. In some embodiments, the response may also indicate that the portable device 306 is a portable device of a second portable device type (e.g., the card utilizes the EMV 1.0 protocol).

The following steps describe a series of exchanges of transaction information between the remote computer 304 and the portable device 306 that are assisted by the TC 302. To conduct a transaction, the remote computer 304 and the portable device 306 may seek to obtain transaction information from each other. For example, the portable device 306 may seek to know what sort of card verification methods are supported by the remote computer 304. The remote computer 304 may seek to obtain the primary account number (PAN), expiration date, country code, and other account information associated with the portable device 306. The TC 302 may utilize the rules engine to facilitate the processing flow between the remote computer 304 and the portable device 306.

At step S320, after receiving the response, the TC 302 may use the rules engine to determine an action to be performed based at least in part on receiving the "Select_PSE" command. By way of example, the rules engine may determine (e.g., from the predefined rules) that a "Loop_Next_AID" process is to be performed.

At step S322, after determining the Loop_Next_AID process is to be performed, the TC 302 may transmit a "Select_Next" message to the portable device 306 in accordance with the "Loop_Next_AID" process. In some embodiments, the "Select_Next" message may be utilized to prompt the portable device 306 to return the next piece of information or data. In some embodiments, the "Loop_Next_AID" rule and the "Select_Next" message may request information regarding which payment application(s) (e.g., a list of AID(s)) may be available on the portable device 306. At step S324, the portable device 306 may transmit selection information to the TC 302.

At step S326, after receiving selection information from the portable device 306, the TC 302 may use the rules engine to determine that the thin client 302 is to continue sending a "Select_Next" message until a "No Information" message is received from the portable device 306. Accordingly, the TC 302 may transmit a second "Select_Next" command to the portable device 306 at S328.

At step S330, after receiving the second "Select_Next" command, the portable device 306 may transmit additional selection information to the TC 302. The steps S322 and S324 may be repeated any suitable number of times. The number of repetitions may be based on the portable device 306 and/or card details such as the selection information.

At step S332, the portable device 306 may transmit a "No Information" message. In some embodiments, the "No Information" message may be transmitted if the portable device 306 has transmitted all of the information relevant to the received commands. In some embodiments, the "No information" message may be included with the Select_Next command (e.g., in the same message received at S330).

In some embodiments, the TC 302 may not communicate with the remote computer 304 after each communication with the portable device 306. The rules engine may allow the TC 302 to determine when to communicate with the portable device 306 or the remote computer 304.

At step S334, after receiving the "No Information" message, the rules engine may determine (e.g., from the predetermined rules) that an "Opened_And_Receive" message is to be sent to the remote computer 304.

At step S340, the TC 302 may transmit a "Opened_And_Receive" message to the remote computer 304 in accordance with the predetermined rules. In some embodiments, the "Opened_And_Receive" message may include requests from the portable device 306 for one or more data elements. In some embodiments, the TC 302 may transmit data (e.g., selection information) previously received from the portable device 306 to the remote computer 304.

At step S342, after receiving the "Opened_And_Receive" message, the remote computer 304 may transmit a response "Opened_And_Send" message to the TC 302. In some embodiments the "Opened_And_Send" message may indicate that application selection is accepted. In some embodiments, the remote computer 304 may also provide via the "Opened_And_Send" message any suitable data elements necessary for the transaction as well as data element requests.

At step S346, after receiving the "Opened_And_Send" message, rules engine may determine that a "Select_Final" command is to be sent to the portable device 306 in response to receiving the "Opened_And_Send" message. This determination may be based at least in part on the predetermined rule set.

At step S348, the TC 302 may transmit a "Select_Final" command to the portable device 306. In some embodiments, the "Select_Final" command may request card information from the portable device 306.

At step S350, after receiving the "Select_Final" command, the portable device 306 may respond to the "Select_Final" command by transmitting card information to the TC 302.

At step S352, after receiving the card information from the portable device 306, the TC 302 may use the rules engine to determine that, due to receiving the card information, a GPO command is to be sent to the portable device 306 based at least in part on the predefined rules.

At step S354, the TC 302 may transmit a GPO command to the portable device 306 in accordance with the predefined rules. At step S356, after receiving the GPO command from the TC 302, the portable device 306 may transmit GPO related data to the TC 302. In some embodiments, the GPO related data may be data regarding processing options.

At step S358, after receiving the GPO related data, the rules engine may determine, based on the predefined rules, that a read record message is to be sent to the portable device 306. In some embodiments, the rules engine may further determine that the TC 302 is not to transmit the GPO related data to the remote computer 304 immediately after receiving it. Thus, the TC 302 may store the GPO related data for later use.

At step S360, the TC 302 may transmit a read record message to the portable device 306 in accordance with the predefined rules. At step S362, after receiving the read record message, the portable device 306 may transmit record information to the TC 302. The steps S360 and S362 may be repeated any suitable number of times.

At step S364, the portable device 306 may transmit a message stating that there is no more record information to the TC 302.

At step S366, after receiving the message stating that there is no more record information, the rules engine may be utilized to determine (e.g., from the predefined rules) that a request for cryptogram generation is to be transmitted to the portable device 306. At step S368, the TC 302 may transmit a request for the portable device 306 to generate an application cryptogram in accordance with the predefined rules.

At step S370, after receiving the request to generate an application cryptogram, the portable device 306 may generate the cryptogram and may transmit the cryptogram to the TC 302.

At step S372, after receiving the cryptogram from the portable device 306, the TC 302 may transmit an "Opened_And_Receive" message to the remote computer 304. The TC 302 may send the cryptogram and PAN (or any suitable data received from the portable device 306) to the remote computer 304.

At step S374, after receiving the "Opened_And_Receive" message from the TC 302, the remote computer 304 may transmit a "Capture_CVM" response message to the TC 302. The "Capture_CVM" response may indicate for the TC 302 to capture a customer signature.

At step S386, the TC 302 may cause the signature of the customer to be captured. At step S388, the TC 302 may transmit a "Capture_CVM" message to the remote computer 304. The TC 302 may provide the signature information to the remote computer 304.

At step S390, the remote computer 304 may transmit a "Close" message to the TC 302. The "Close" response may indicate for the TC 302 to close the transaction. In response to receiving the "Close" message, the TC 302 may cease processing the transaction. In some embodiments, the TC 302 may delete any previously stored data related to the transaction.

Figure 4:
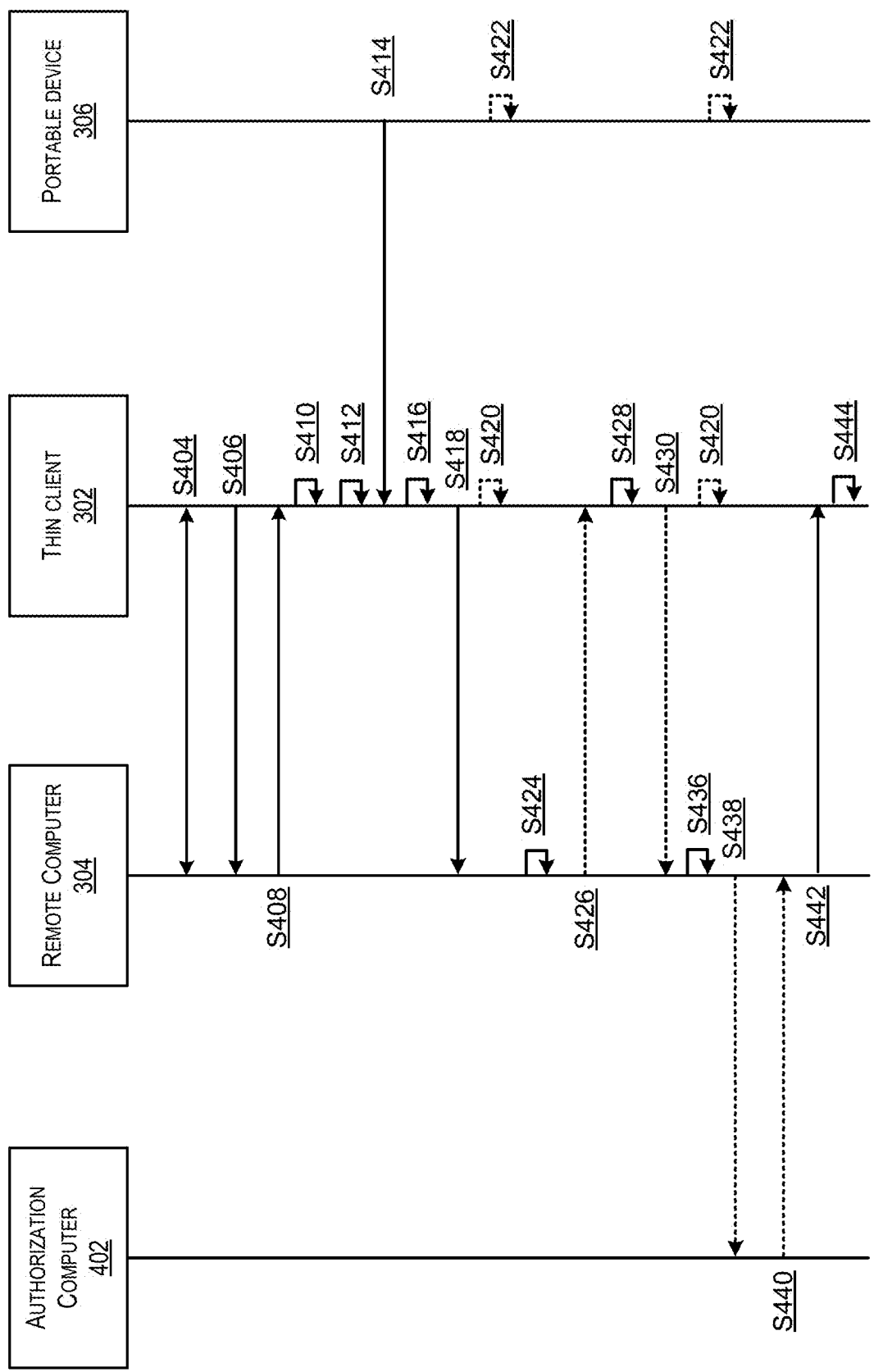
FIG. 4 illustrates a protocol for performing a transaction utilizing a rules engine, in accordance with at least on embodiment.

FIG. 4 illustrates a protocol 400 for performing a transaction utilizing a rules engine, in accordance with at least on embodiment. The steps described in connection with protocol 400 are intended to be illustrative and non-limiting. More or fewer steps may be performed within protocol 400 as desired. The protocol 400 may be performed by a remote computer 304 (e.g., the remote computer 102 and 304 of FIGS. 1 and 3, respectively), a thin client (TC) 302 (e.g., the thin client 104 and 302 of FIGS. 1 and 3, respectively), a portable device 306 (e.g., the portable device 106 and 306 of FIGS. 1 and 3, respectively). FIG. 4 is intended to illustrate an embodiment in which a rules engine operating on the thin client 302 may manage the processing flow between the remote computer 304 and the portable device 306 to complete a transaction, including the collection of verification data. In some embodiments in which online authorization is desired, the protocol may additionally be performed by an authorization computer 402. The authorization computer 402 may be communicatively coupled to the remote computer 304 and may be configured to perform any suitable authorization operations to authorize payment by the user of the portable device 306. Prior to beginning protocol 400 an entity (e.g., a merchant) may initiate the transaction at the thin client 302 utilizing the portable device 306 (e.g., a 1st Generation EMV card, a mobile based payment instrument such as a smartphone, etc.).

At S404, the TC 302 may perform operations to establish a secure connection with the remote computer 304. In some embodiments, the portable device 306 may operate utilizing a first communications protocol while the remote computer 304 utilizes a second communications protocol. It may be the case that the second communications protocol includes mechanisms for establishing a secure connection, while the first communications protocol does not. While establishing the secure connection, the TC 302 and remote computer 304 may mutually authenticate one another and perform session key exchange procedures.

At S406, TC 302 may initiate the transaction with the remote computer 304 by sending a "Begin_Transaction" message. The message may include pertinent transaction details such as amount, currency code, cashback, date, time, country code, and the like.

At S408, the remote computer 304 may perform preprocessing activities using the transaction details provided by the TC 302 to identify a list of one or more eligible interfaces and of one or more eligible application(s). The remote computer 304 may generate unique POS data to be provided to the portable device. The remote computer 304 may then transmit a "Detect_And_Open_And_Send" message to TC 302 that includes the POS data including the list of eligible interfaces and of eligible applications. This message may serve as a request to the TC 302 for all necessary payment instrument data to process the transaction such as: a payment account number (PAN) (or a token), an expiration date, a cryptogram, etc.

At S410, the rules engine executing on the thin client 302 may determine from predefined rules that, on receipt of the "Detect_And_Open_And_Send," the user of the portable device 306 is to be prompted to present a payment instrument on one of the eligible interfaces.

At S412, the thin client 302 may display a prompt at a reader to indicate that the user is to present the payment instrument (e.g., the portable device 306). At S414, in response to the prompt, the user may present the portable device 306 at one of the interfaces (e.g., a contact or contactless interface). Presentation (e.g., a swipe or tap) may cause the portable device 306 to provide a list of available applications to the TC 302.

At S416, the rules engine, utilizing the predefined rules, causes the TC 302 to execute a script (e.g., a SELECT_PPSE_APDU script) to select a matching application between the list provided by the remote computer 304 and the list provided by the portable device 306. Based on the result of the script, an application is selected. TC 302 may then execute one or more additional scripts to obtain all of the data of portable device 306 that was requested by the remote computer 304 at S408. These exchange(s) between TC 302 and the portable device 306 are not depicted. In some embodiments, the TC 302 may perform any suitable conversion operations to convert the data of the portable device 306 into a corresponding value of the communications protocol utilized by the remote computer 304.

At S418, TC 302 may transmit all of the requested data obtained from the portable device 306. This data may be transmitted in an "Opened_And_Receive" message. The communications protocol utilized by the remote computer 304 may include such a message.

In some embodiments, at S420, once the data has been transmitted at S418, the TC 302 may prompt the user to remove the payment instrument (e.g., the portable device 306). At S422, the user may remove the portable device 306 from the interface. It should be appreciated that in other embodiments, the prompt and removal of the portable device 306 may occur later in the protocol.

At S424, the remote computer 304 may process the payment instrument data provided by the TC 302 at S418. In some embodiments, the remote computer 304 may determine that the payment instrument requires verification data to be captured (e.g., an offline PIN, a signature, etc.).

If verification data is to be collected, the remote computer 304 may transmit a request to collect such data (e.g., via a Capture_CVM message) to TC 302 at S426. At S428, the rules engine operating on TC 302 may identify a number of operations to be performed to collect verification data. According to the rules identified by the rules engine, the TC 302 may utilize any suitable onboard verification entry device (e.g., pin pad, touch screen, keyboard, biometric reader, etc.) to collect verification data from the user of portable device 306.

At S430, TC 302 may transmit the collected verification data to the remote computer 304 via a "Return_CVM_Capture" message.

In some embodiments, at S432, once the verification data has been transmitted at S430, the TC 302 may prompt the user to remove the payment instrument (e.g., the portable device 306). At S434, the user may remove the portable device 306 from the interface.

At S436, the remote computer 304 may process the payment instrument data (and in some cases the verification data) provided by the TC 302 to determine whether to go online for authorization or to stay offline.

If online authorization is to be performed, the remote computer 304 transmit any suitable data to the authorization computer 402 at S438. The authorization computer 402 may perform any suitable operations for determining whether or not to authorize the transaction. At S440, the authorization computer 402 may transmit an indication of approval or denial for the transaction to the remote computer 304.

At S442, the remote computer 304 may transmit a "Transaction_Complete" message including data indicating the final transaction outcome.

At S444, the thin client 302 may utilize any suitable interface (e.g., a display) to indicate the outcome of the transaction (e.g., "approved" or "declined"). The TC 302 may then discard the session keys established with the remote computer 304 and return to an idle state.

Figure 5:
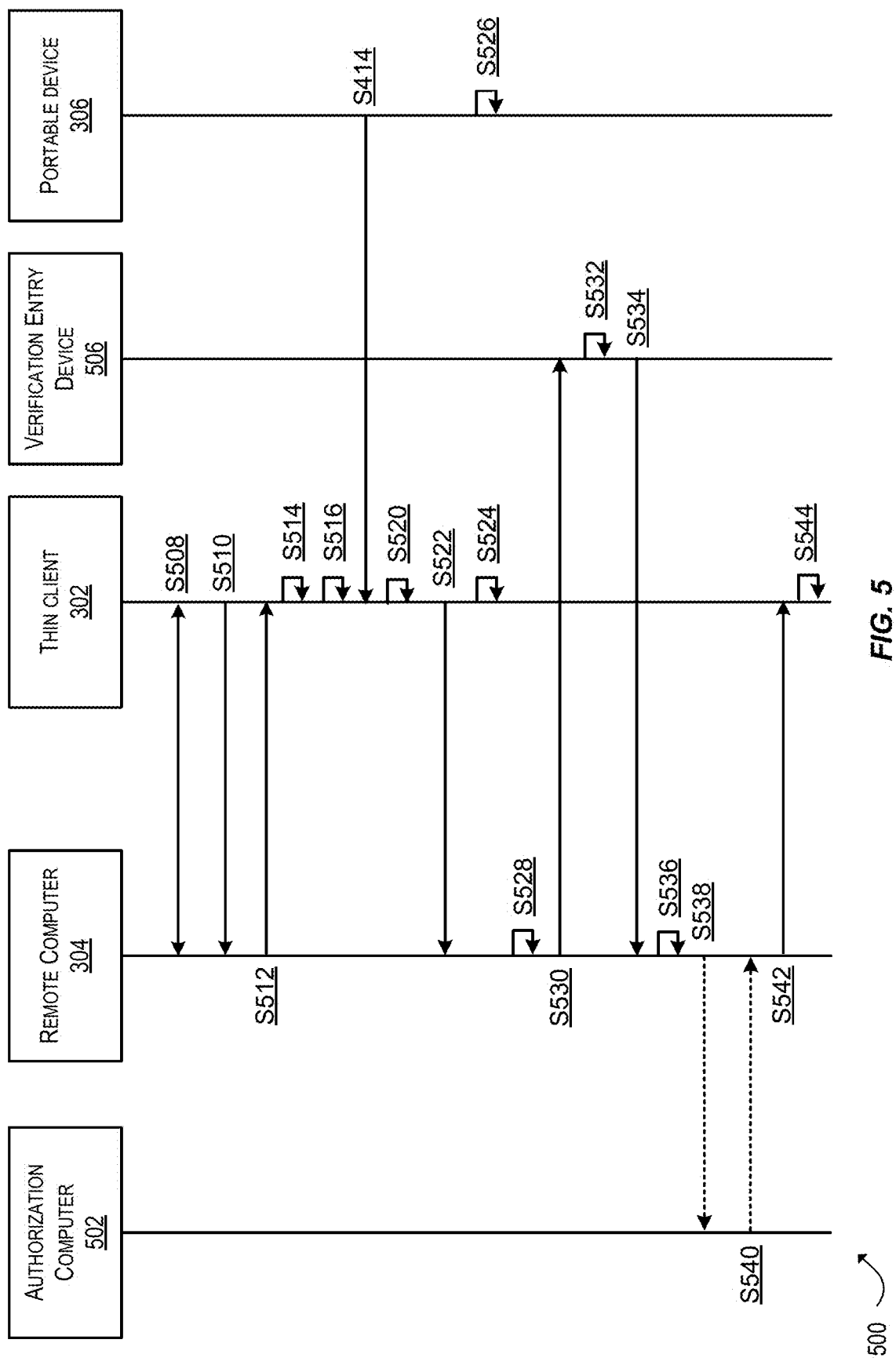
FIG. 5 shows yet another protocol for performing a transaction, in accordance with at least on embodiment.

FIG. 5 shows yet another protocol 500 for performing a transaction, in accordance with at least on embodiment. The steps described in connection with protocol 500 are intended to be illustrative and non-limiting. More or fewer steps may be performed within protocol 500 as desired. The protocol 500 may be performed by a remote computer 304 (e.g., the remote computer 102 and 304 of FIGS. 1 and 3, respectively), a thin client (TC) 302 (e.g., the thin client 104 and 302 of FIGS. 1 and 3, respectively), a portable device 306 (e.g., the portable device 106 and 306 of FIGS. 1 and 3, respectively). FIG. 5 is intended to illustrate an embodiment in which a rules engine operating on the thin client 302 may manage the processing flow between the remote computer 304 and the portable device 306 to complete a transaction including the use of the verification entry device 506. In some embodiments in which online authorization is desired, the protocol may additionally be performed with an authorization computer 502 (e.g., the authorization computer 402 of FIG. 4). The authorization computer 502 may be communicatively coupled to the remote computer 304 and may be configured to perform any suitable authorization operations to authorize payment by the user of the portable device 306. In some embodiments, the protocol 500 may also be performed utilizing a verification entry device 506 (e.g., a keypad, a touchscreen, a biometric reader, etc.). Prior to beginning protocol 500 an entity (e.g., a merchant) may initiate the transaction at the thin client 302 utilizing the portable device 306 (e.g., a $1^{st}$ Generation EMV card, a mobile based payment instrument such as a smartphone, etc.).

At S508, the TC 302 may perform operations to establish a secure connection with the remote computer 304. In some embodiments, the portable device 306 may operate utilizing a first communications protocol while the remote computer 304 utilizes a second communications protocol. It may be the case that the second communications protocol includes mechanisms for establishing a secure connection, while the first communications protocol does not. While establishing the secure connection, the TC 302 and remote computer 304 may mutually authenticate one another and perform session key exchange procedures.

At S510, TC 302 may initiate the transaction with the remote computer 304 by sending a "Begin_Transaction" message. The message may include pertinent transaction details such as amount, currency code, cashback, date, time, country code, and the like.

At S512, the remote computer 304 may perform preprocessing activities using the transaction details provided by the TC 302 to identify a list of one or more eligible interfaces and of one or more eligible application(s). The remote computer 304 may generate unique POS data to be provided to the portable device. The remote computer 304 may then transmit a "Detect_And_Open_And_Send" message to TC 302 that includes the POS data including the list of eligible interfaces and of eligible applications. This message may serve as a request to the TC 302 for all necessary payment instrument data to process the transaction such as: a payment account number (PAN) (or a token), an expiration date, a cryptogram, etc.

At S514, the rules engine executing on the thin client 302 may determine from predefined rules that, on receipt of the "Detect_And_Open_And_Send," the user of the portable device 306 is to be prompted to present a payment instrument on one of the eligible interfaces.

At S516, the thin client 302 may display a prompt at a reader to indicate that the user is to present the payment instrument (e.g., the portable device 306). At S518, in response to the prompt, the user may present the portable device 306 at one of the interfaces (e.g., a contact or contactless interface). Presentation (e.g., a swipe or tap) may cause the portable device 306 to provide a list of available applications to the TC 302.

At S520, the rules engine, utilizing the predefined rules, causes the TC 302 to execute a script (e.g., a SELECT_PPSE_APDU script) to select a matching application between the list provided by the remote computer 304 and the list provided by the portable device 306. Based on the result of the script, an application is selected. TC 302 may then execute one or more additional scripts to obtain all of the data of portable device 306 that was requested by the remote computer 304 at S408. These exchange(s) between TC 302 and the portable device 306 are not depicted.

At S522, TC 302 may transmit all of the requested data obtained from the portable device 306. This data may be transmitted in an "Opened_And_Receive" message.

In some embodiments, at S524, once the data has been transmitted at S522, the TC 302 may prompt the user to remove the payment instrument (e.g., the portable device 306). At S526, the user may remove the portable device 306 from the interface. It should be appreciated that in other embodiments, the prompt and removal of the portable device 306 may occur later in the protocol.

At S528, the remote computer 304 may process the payment instrument data provided by the TC 302. In some embodiments, the remote computer 304 may determine that the payment instrument requires verification data to be captured (e.g., an offline PIN, a signature, etc.).

If verification data is to be collected, the remote computer 304 may transmit a request to collect such data (e.g., via a Capture_CVM message) to the verification entry device 506 at S530. At S532, the verification entry device (e.g., pinpad, touch screen, keyboard, biometric reader, etc.) may execute any suitable operations to collect verification data from the user of the portable device 306.

At S534, verification entry device 506 may transmit the collected verification data to the remote computer 304 via a "Return_CVM_Capture" message.

At S536, the remote computer 304 may process the payment instrument data (and in some cases the verification data) provided by the verification entry device 506 to determine whether to go online for authorization or to stay offline.

If online authorization is to be performed, the remote computer 304 may transmit any suitable data to the authorization computer 502 at S538. The authorization computer 502 may perform any suitable operations for determining whether to authorize the transaction. At S540, the authorization computer 502 may transmit an indication of approval or denial for the transaction to the remote computer 304.

At S542, the remote computer 304 may transmit a "Transaction_Complete" message including data indicating the final transaction outcome.

At S544, the thin client 302 may utilize any suitable interface (e.g., a display) to indicate the outcome of the transaction (e.g., "approved" or "declined"). The TC 302 may then discard the session keys established with the remote computer 304 and return to an idle state.

Figure 6:
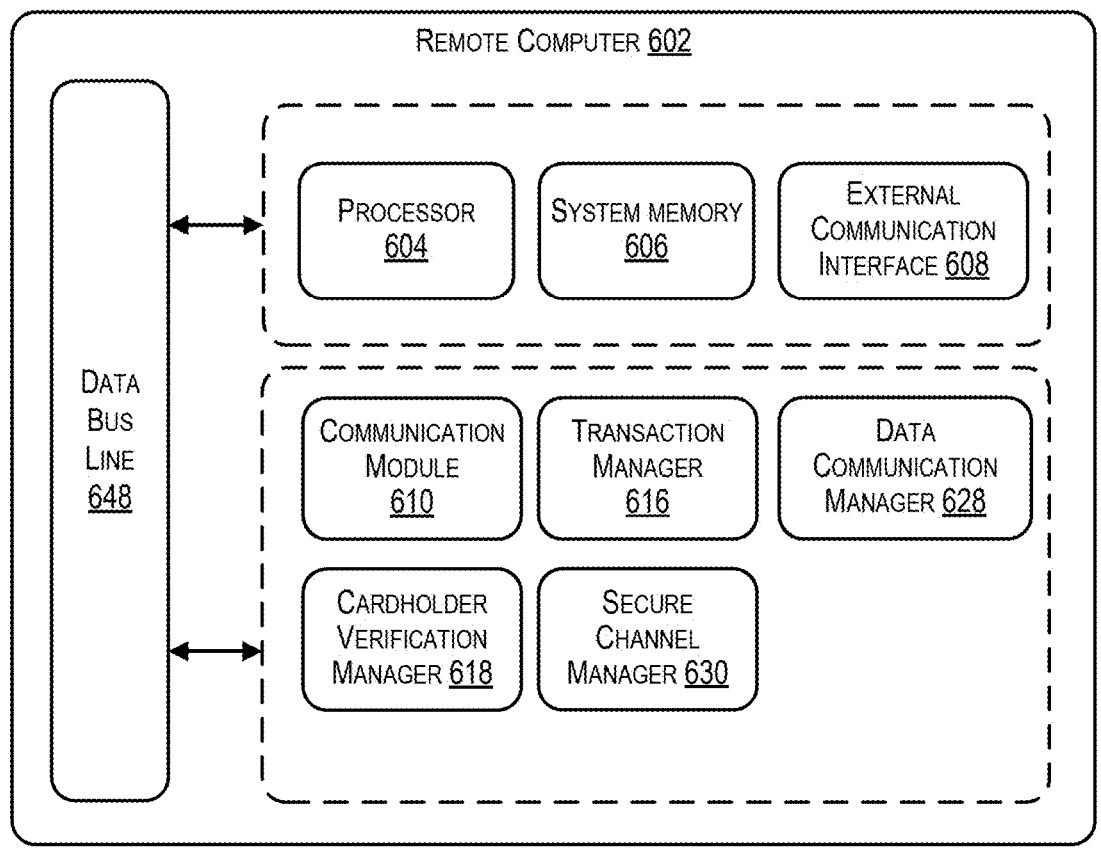
FIG. 6 illustrates a block diagram of a remote computer, in accordance with at least one embodiment.

FIG. 6 illustrates a block diagram of a remote computer 602, according to at least one embodiment. The remote computer 602 may be an example of the remote computers 102 and 304 of FIGS. 1-5. The remote computer 602 is illustrated as comprising a plurality of hardware and software modules (604-630). However, it should be appreciated that this is provided for illustration purposes only, and each of the modules and associated functionality may be provided and/or performed by the same or different components. That is, the remote computer 602 may perform some of the relevant functions and steps described herein with reference to the remote computers 102 and 304 through the use of any suitable combination of software instructions and/or hardware configurations. It should be noted that although FIG. 6 illustrates all of the modules located on a single device, the disclosure is not meant to be so limited. Moreover, a system for implementing the functionality described herein may have additional components or less then all of these components. Additionally, some modules may be located on other devices such as a remote server or other local devices that are functionally connected to the server computer component(s). In some cases, the software modules may be located on a virtual machine or a container.

The remote computer 602 may be a server computer (e.g., a server computer operating in a cloud computing environment). The remote computer 602 is shown as comprising a processor 604, system memory 606 (which may comprise any combination of volatile and/or non-volatile memory such as, for example, buffer memory, RAM, DRAM, ROM, flash, or any other suitable memory device), and an external communication interface 608. Moreover, one or more of the modules 610-630 may be disposed within one or more of the components of the system memory 606, or may be disposed externally. As was noted above, the software and hardware modules shown in FIG. 6 are provided for illustration purposes only, and the configurations are not intended to be limiting. The processor 604, system memory 606 and/or external communication interface 608 may be used in conjunction with any of the modules 610-630 described below to provide a desired functionality. Some exemplary modules and related functionality may be as follows:

A communication module 610 may be configured or programmed to perform some or all of the functionality associated with receiving, sending, and generating electronic messages for transmission at the remote computer 602 to or from any of the entities shown in FIGS. 1-5 (e.g., a thin client, an authorization computer, etc.). When an electronic message is received by the remote computer 602 via the external communication interface 608, it may be passed to the communication module 610. The communication module 610 may identify and parse the relevant data based on a particular messaging protocol used in the remote computer 602 (e.g., EMV 2.0). The communication module 610 may then transmit any received information to an appropriate module within the remote computer 602 (e.g., via a data bus line 648). The communication module 610 may also receive information from one or more of the modules in the remote computer 602 and generate an electronic message in an appropriate data format in conformance with a transmission protocol used in the remote computer 602 so that the message may be sent to one or more entities within system (e.g., to the thin clients 104 or 302 of FIGS. 1-5). The electronic message may then be passed to the external communication interface 608 for transmission.

A data communication manager 628 may be programmed and/or configured to perform functionality associated with (1) preparing and managing a list of data objects requested by the transaction processing module and providing the requested data objects received from the portable device, and (2) managing and responding to the portable device's data objects requests by populating the message sent to the access device with corresponding data objects obtained from the transaction processing module 616.

In some embodiments, the transaction processing module 616 may inform the data communication manager 628 about its data request statuses. If transaction processing module 616 needs data from the portable device, the data communication manager list may include the corresponding data identifiers. Otherwise, the data communication manager list may be empty. Meanwhile, the portable device may inform the data communication manager 628 about its data requests status. If a portable device requests data from the remote computer 602, the portable device list may include the corresponding data identifiers. If the portable device has no immediate data request, the portable device list may be empty. Additionally, the portable device may provide data objects that the data communication manager requested.

The data communication manager 628 may synchronize the exchange of data between a portable device and the remote computer 602 in order to optimize performance and minimize the number of communications exchanged with the portable device. Additionally, the data communication manager 628 may cause the secure channel manager 630 to send secured communications to the thin client and/or the portable device. When a communication channel is established with the thin client or the portable device, the thin client, portable device, and/or the transaction processing module 616 may inform the data communication manager 628 of their security level preferences, hence directing the data communication manager 628 to interact accordingly with the secure channel manager 630.

The secure channel manager 630 may be programmed and/or configured to perform functionality associated with securing data exchanges with the thin client and/or the portable device in a way that is transparent to the data communication manager 628 and transaction processing module 616. In some embodiments, the secure channel manager 630 may negotiate a shared secret with the thin client and/or the portable device in order to establish a secure communications channel through which encrypted data may be sent. Once established, the secure channel manager may be configured to encrypt data prior to transmitting the encrypted data to the thin client and/or the portable device.

Figure 7:
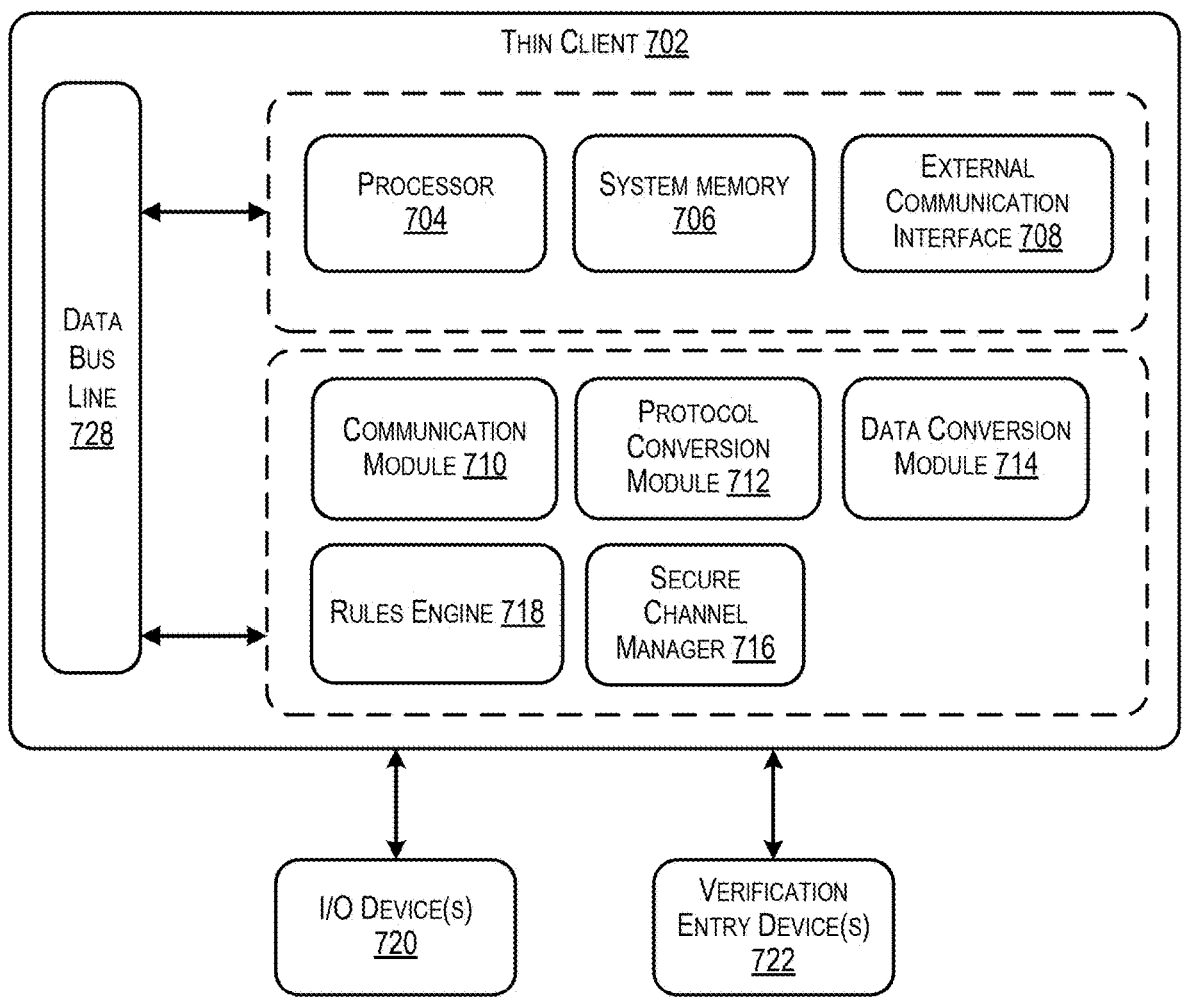
FIG. 7 illustrates a block diagram of a thin client, in accordance with at least one embodiment.

FIG. 7 illustrates a block diagram of the thin client 702, according to at least one embodiments. The thin client 702 (an example of the thin clients 104 and 302 of FIGS. 1-5) is illustrated as comprising a plurality of hardware and software modules (704-716). However, it should be appreciated that this is provided for illustration purposes only, and each of the modules and associated functionality may be provided and/or performed by the same or different components. That is, the thin client 702 may, for instance, perform some of the relevant functions and steps described herein through the use of any suitable combination of software instructions and/or hardware configurations.

The thin client 702 is shown as comprising a processor 704, system memory 706, and an external communication interface 708. Moreover, one or more of the modules 710-716 may be disposed within one or more of the components of the system memory 706, or may be disposed externally. The processor 704, system memory 706 and/or external communication interface 708 may be used in conjunction with any of the modules described below to provide a desired functionality. Some exemplary modules and related functionality may be as follows.

A communication module 710 may be configured or programmed to perform some or all of the functionality associated with receiving, sending, and generating electronic messages for transmission at the thin client 702 to or from any of the entities shown in the figures above. When an electronic message is received by the thin client 702 via the external communication interface 708, it may be passed to the communication module 710. The communication module 710 may identify and parse the relevant data based on a particular messaging protocol used to communication the data (e.g., EMV 1.0, EMV 2.0, etc.). The communication module 310 may then transmit any received information to an appropriate module within the thin client 702 (e.g., via a data bus line 728). The communication module 710 may also receive information from one or more of the modules in the thin client 702 and generate an electronic message in an appropriate data format in conformance with a transmission protocol used by the intended recipient such that the message may be sent to one or more entities (e.g., to the remote computer 102, the portable device 106 of FIG. 1). The electronic message may then be passed to the external communication interface 708 for transmission.

A communication module 710 may be configured or programmed to perform some or all of the functionality associated with communicating with portable devices. In particular, the communication module 710 may be responsible for (1) establishing, maintaining, and terminating a session with a portable device, (2) allowing the exchange of messages within a given session, (3) and allowing multiple sessions to coexist.

The protocol conversion module 712 may be configured to perform some or all of the functionality associated with converting communications sent between a portable device and a remote computer from one communication protocol (e.g., a first communication protocol) to another (e.g., a second communication protocol). The protocol conversion module 712 may be responsible for determining what communication protocol (e.g., EMV 1.0 or EMV 2.0) a particular device is configured to use. Based on this determination, the protocol conversion module 712 may handle the conversion of communications exchanged for a transaction if requested. For example, a communication originating from a portable device may be received by the communication module 710. Based on a determination that the portable device uses the second communication protocol while the remote computer uses the first communication protocol, the protocol conversion module may convert the communication from the second communication protocol to the first communication protocol before forwarding the converted communication to the remote computer (e.g., via a secured channel).

In particular, the protocol conversion module 712 may be responsible for (1) requesting the communication module 710 to establish, maintain, and terminate a session with a portable device, and (2) synchronizing the exchange of messages between the portable device and the remote computer in order to optimize performance and minimize the number of communications exchanged with the remote computer.

In order to do so, the protocol conversion module 712 may be configured or programmed to (1) create, format, and exchange as many messages as necessary within a given session, to fulfill as many as possible data requests from the remote computer and (2) create, format, and exchange as many messages as necessary within a given session, to fulfill as many as possible data requests from the portable device.

The data conversion module 714 may be configured or programmed to perform some or all of the functionality associated with converting data sent between portable devices and the remote computer from one data format (e.g., associated with the first communication protocol) to another (e.g., the format associated with the second communication protocol). The data conversion module 714 may be responsible for determining what communication protocol (e.g., EMV 1.0 or EMV 2.0) a particular portable device is configured to use. Based on this determination, the data conversion module 714 may handle the conversion of data to the communication protocol of the recipient device. For example, a communication originating from the portable device may be received by the communication module 710. Based on a determination that the portable device uses the second communication protocol while the remote computer uses the first communication protocol, the data conversion module 714 may convert the data format associated with the second communication protocol to the format appropriate for the first communication protocol before forwarding the converted data to the remote computer (e.g., via a secured channel).

The secure channel manager 716 may be programmed and/or configured to perform functionality associated with securing data exchanges with a remote computer and/or a portable device in a way that is transparent to the modules of the thin client 702. In some embodiments, the secure channel manager 716 may negotiate a shared secret with the remote computer and/or the portable device in order to establish a secure communications channel through which encrypted data may be sent. Once established, the secure channel manager may be configured to encrypt data prior to transmitting the encrypted data to the remote computer and/or the portable device. In some embodiments, any message being transmitted by the thin client 702 may be transmitted utilizing the secure channel manager 716 and the secure channel established/maintained by the secure channel manager 716.

The rules engine 718 may be configured or programmed to perform some or all of the functionality discussed herein. By way of example, the rules engine 718 may be configured to interpret and implement a set of rules. In some embodiments, the rules engine 718 may process chaining messages/events from/to a remote computer and/or a portable device. In some embodiments, the rules engine 718 may make limited local decisions based on rules provided by the remote computer or any other suitable device. One or more sets of rules (e.g., rules defined in a markup language such as XML and/or JSON, one or more executable scripts, etc.) may be received by the processor 704 from the remote computer (or any suitable device) and provided to the rules engine 718 (e.g., via the communications module 710. The rules engine 718 may be configured to store these one or more sets of rules for later use. Through storing these rules, the thin client may be configured to implement the rules utilizing the rules engine 718.

In some embodiments, upon receipt of any suitable message, or at any suitable time, the functionality of the rules engine 718 may be invoked. The rules engine 718 may interpret stored rules to identify one or more actions to be taken in response to a given stimulus. The rules engine 718 can act as a driver to the thin client 702 such that determinations made by the rules engine may be utilized to drive the actions performed by the thin client 702 (e.g., execution of scripts, transmission of messages, storing data, etc.). In some embodiments, executable scripts may be provided to the rules engine 718 along with, or in addition to the one or more sets of rules and the rules engine 718 may identify appropriate times at which these scripts are to be executed by the thin client 702.

In some embodiments, thin client 702 may be communicatively coupled to one or more I/O device(s) 720 or the I/O device(s) 720 may operate locally at the thin client 702 as a component of the thin client 702. The I/O devices(s) 720 may include, but are not limited to, displays, keypads, keyboards, touch screens, biometric readers, card readers, or the like. In some embodiments, in accordance with the one or more previously store rules, the rules engine 718 may cause the processor 704 to present and/or collect data at the I/O device(s) 720. For example, the rules engine 718 may identify, based on the predefined set of rules, that a user should be prompted at a display to present their portable device. Accordingly, the rules engine 718 can cause the processor 704 to provide information to the I/O device(s) 720 to effectuate the display.

In some embodiments, thin client 702 may be communicatively coupled to one or more verification entry device(s) 722 or the verification entry device(s) 722 may operate locally at the thin client 702 as a component of the thin client 702. The verification entry device(s) 722 may include, but are not limited to, displays, keypads, keyboards, touch screens, biometric readers, or the like. In some embodiments, in accordance with the one or more previously store rules, the rules engine 718 may cause the processor 704 to collect data utilizing the verification entry device(s) 722. For example, the rules engine 718 may identify, based on the predefined set of rules, that a user should be prompted to provide a signature and/or a PIN or password. Accordingly, the rules engine 718 can cause the processor 704 to provide information to the verification entry device(s) 722 to effectuate the collection of such data.

Figure 8:
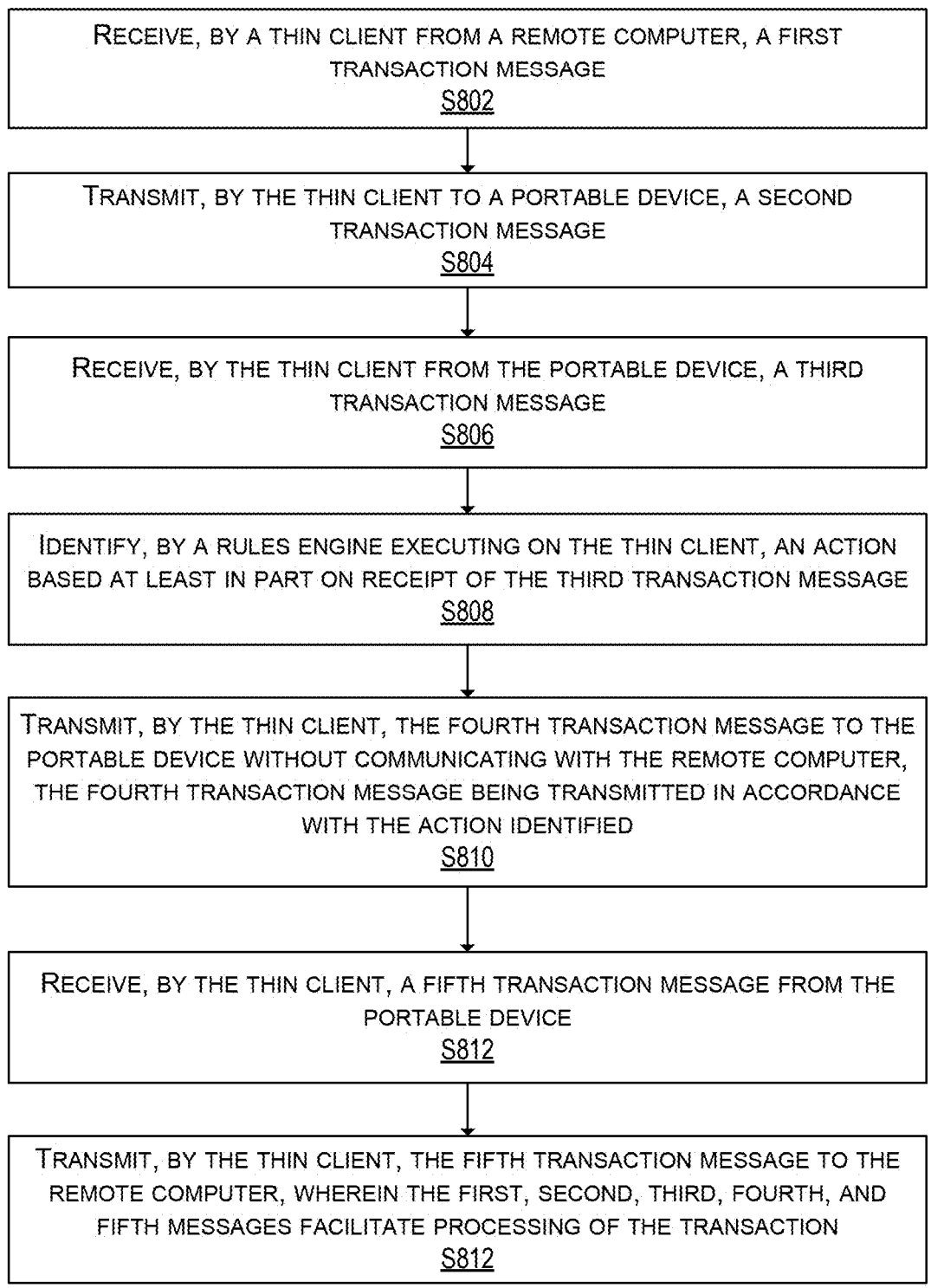
FIG. 8 shows a flowchart of a method for performing a transaction according to some embodiments.

FIG. 8 shows a flowchart of a method 800 for conducting a transaction according to some embodiments. The method may be performed by a thin client in any suitable order. More or fewer steps may be included in the method 800.

The method 800 may begin at 802, a thin client may receive a first transaction message from a remote computer. The first transaction message may be analogous to the above start app selection message at step S208 of FIG. 2.

At 804, the thin client may transmit a second transaction message to a portable device. The second transaction message may be analogous to the above select NGSE message at step S210 of FIG. 2.

At 806, a third transaction message may be received by the thin client from the portable device. The third transaction message may be analogous to the above NGSE selected message at step S212 of FIG. 2.

At 808, a rules engine executing on the thin client may identify an action based at least in part on receipt of the third transaction message. By way of example, the action identified may indicate that a fourth transaction message is to be generated and transmitted to the portable device.

At 810, the fourth transaction message may be transmitted by the thin client to the portable device without communicating with the remote computer. The fourth transaction message may be transmitted in accordance with the action identified. The fourth transaction message may be analogous to the above message containing wrapped transaction and POS data at step S214 of FIG. 2.

At 812, a fifth transaction message may be received by the thin client from the portable device. The fifth transaction message may be analogous to the above candidate list message at step S216 of FIG. 2.

At 814, the fifth transaction message may be transmitted by the thin client to the remote computer. Transmitting the fifth transaction message to the remote computer may be analogous to step S218 of FIG. 2. It should be appreciated that the first, second, third, fourth, and fifth transaction messages facilitate processing of the transaction.

In some embodiments, the method 800 may be repeated any number of suitable times and the transaction messages therein may relate to any suitable transaction data or information.

Figure 9:
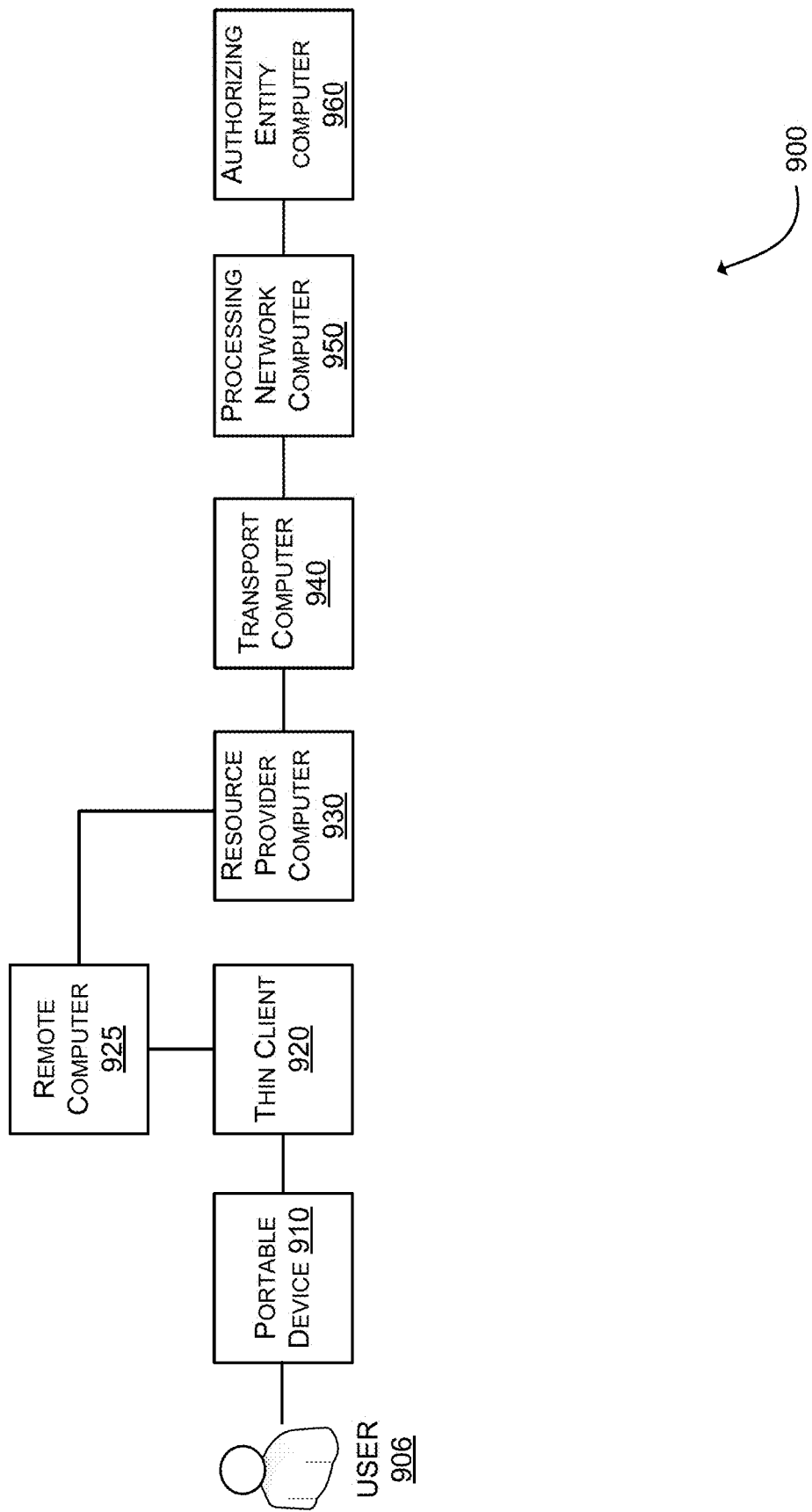
FIG. 9 shows a block diagram illustrating a transaction processing system.

FIG. 9 shows a block diagram of a transaction processing system 900. FIG. 9 shows a user 906 that can operate a portable device 910 (e.g., an example of the portable devices 106 and 306 of the figures above). The user 906 may use the portable device 910 to pay for a good or service, such as a ticket, at a resource provider (e.g., a merchant). In some embodiments, the portable device 910 is a credit card or debit card issued by the authorizing entity. The resource provider may operate a resource provider computer 930 and/or a thin client 920 (a type of access device). The resource provider computer 930 may be configured to communicate with an authorizing entity computer 960 operated by, or on behalf of, an authorizing entity, via a transport computer 940 (operated by an acquirer) and a processing network computer 950 operating as part of a payment processing network.

The payment processing network may include data processing subsystems, networks, and operations used to support and deliver authorization services, exception file services, and clearing and settlement services. An exemplary payment processing network may include VisaNet™. Payment processing networks such as VisaNet™ are able to process credit card transactions, debit card transactions, and other types of commercial transactions. VisaNet™, in particular, includes a VIP system (Visa Integrated Payments system) which processes authorization requests and a Base II system which performs clearing and settlement services. The payment processing network may use any suitable wired or wireless network, including the Internet.

A typical payment transaction can be described as follows, the user 906 will insert the portable device 910 into an interface of the thin client 920 (e.g., a card reader). In some embodiments, the portable device 910 may be held near the thin client 920. The thin client 920 may be configured to facilitate communications between the remote computer 925 and the portable device 910. The remote computer 925 is intended to be an example of the remote computers 102 and 304 of the above figures. In some embodiments, the remote computer 925 is configured to perform POS functionality. The thin client 920 may facilitate data exchange between the remote computer 925 and the portable device 910 in any suitable manner and as described in the above figures. Once POS data and payment data (or any suitable data) are exchanged between the remote computer 925 and the portable device 910, the remote computer 925 may be configured to initiate a transaction via the resource provider computer 930.

The resource provider computer 930 may receive this information from the remote computer 925 via an external communication interface. The resource provider computer 930 may then generate an authorization request message that includes at least a portion of the information received from the thin client 920 and electronically transmits this message to a transport computer 940. The transport computer 940 may then receive, process, and forward the authorization request message to a processing network computer 950 for authorization.

In general, prior to the occurrence of a credit or debit-card transaction, the processing network computer 950 has an established protocol with each issuer on how the issuer's transactions are to be authorized. In some cases, such as when the transaction amount is below a threshold value, the processing network computer 950 may be configured to authorize the transaction based on information that it has about the user's account without generating and transmitting an authorization request message to the authorizing entity computer 960. In other cases, such as when the transaction amount is above a threshold value, the processing network computer 950 may receive the authorization request message, determine the issuer associated with the portable device 910, and forward the authorization request message for the transaction to the authorizing entity computer 960 for verification and authorization. Once the transaction is authorized, the authorizing entity computer 960 may generate an authorization response message (that may include an authorization code indicating the transaction is approved or declined) and transmit this electronic message via its external communication interface to processing network computer 950. The processing network computer 950 may then forward the authorization response message to the transport computer 940, which in turn may then transmit the electronic message to comprising the authorization indication to the resource provider computer 930, then to the remote computer 925, and then to the thin client 920.

At the end of the day or at some other suitable time interval, a clearing and settlement process between the resource provider computer 930, the transport computer 940, the processing network computer 950, and/or the authorizing entity computer 960 may be performed on the transaction.

FIG. 10 shows a block diagram of a building access system 1000. FIG. 10 shows a portable device 1010 (e.g., the portable device 106 and 306 of FIGS. 1-5) operated by a user 1006. The portable device 1010 can interact with the thin client 1020 to exchange data with the remote computer 1025 (e.g., a device that manages access to the building 1030).

An access transaction can be described as follows, the user 1006 will insert the portable device 1010 into an interface of the thin client 702 (e.g., a card reader). In some embodiments, the portable device 1010 may be held near the thin client 1020. The thin client 1020 may perform any suitable conversion to convert (if necessary) the data and/or messages received from the portable device 1010 to data and/or messages corresponding to a communications protocol utilized by the remote computer 1025 (EMV 2.0). The thin client 1020 may further implement a rules engine that is configured to interpret previously defined rules in order to effect the processing flow of the data and/or messages exchanged between the remote computer 1025 and the portable device 1010 via the thin client 1020. The thin client 1020, utilizing the rules engine, may facilitate a data exchange between the portable device 1010 and the remote computer 1025. The remote computer 1025 may be configured to verify the user 1006 according to the data provided by the portable device 1010 via the thin client 1020.

If the remote computer 1025 is able to verify the user 1006 utilizing the data provided by the portable device 1010 and previously stored credentials (e.g., the data provided by the portable device 1010 matches previously stored credentials associated with the user 1006), the remote computer 1025 may be configured to allow the user 1006 access to the building 1030 (or any suitable secure location/resource managed by the remote computer 1025). If the user 1006 is not verified (e.g., the data provided by the portable device 1010 does not match the previously stored credentials associated with the user 1006), the remote computer 1025 may be configured to deny the user 1006 access to the building 1030 (or any suitable secure location/resource managed by the remote computer 1025).

Technical Improvements

Embodiments of the invention provide for a number of advantages. For example, by utilizing a rule engine, the thin client may communicate with the portable device without first communicating with the remote computer every time it receives a message. By doing so, there is a reduction in the number of round trips between the portable device and the remote computer. The rules engine may instruct the thin client to communicate with the portable device multiple times before responding to the remote computer. This will improve the overall speed of the transaction, relative to other types of system configurations. By way of example, without utilizing the rules engine, the number of interactions between a remote computer and a thin client may equal ten messages as indicated in FIG. 1. However, by utilizing the rules engine discussed herein, the number of messages exchanged between the remote computer and the thin client may be reduced by over half (e.g., to 4 messages). Given the massive number of transactions being performed throughout the world, utilizing the rules engine to reduce the number of message exchanges between components provides a significant processing improvement and improves the efficiency of the system as a whole.

The rules engine is configurable through rules that are received at the thin client. These rules may be transmitted to the thin client at any suitable time from any suitable source. If the rules by which the thin client operates need to be altered, the remote computer (or another suitable device) may transmit new rules to the thin client. As the rules define the operations performed by the thin client, the functionality provided by the thin client may be modified by the new rules without replacing or updating the software of the thin client or the rules engine.

It should be understood that any of the embodiments of the present invention can be implemented in the form of control logic using hardware (e.g. an application specific integrated circuit or field programmable gate array) and/or using computer software with a generally programmable processor in a modular or integrated manner. As used herein, a processor includes a single-core processor, multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C, C++, C #, Objective-C, Swift, or scripting language such as Perl or Python using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

The above description is illustrative and is not restrictive. Many variations of the invention will become apparent to those skilled in the art upon review of the disclosure. The scope of the invention should, therefore, be determined not with reference to the above description, but instead should be determined with reference to the pending claims along with their full scope or equivalents.

One or more features from any embodiment may be combined with one or more features of any other embodiment without departing from the scope of the invention.

As used herein, the use of "a," "an," or "the" is intended to mean "at least one," unless specifically indicated to the contrary.

What is claimed is:

1. A computer-implemented method for conducting a transaction, the method comprising:
   receiving, from a remote computer by a rules engine executing at a thin client, a set of rules defining one or more actions to be executed in response to receiving one or more particular transaction messages, the thin client being communicatively disposed between the remote computer and a portable device and configured to manage a processing flow for communications between the portable device and the remote computer using the one or more actions, the remote computer being configured to provide point-of-sale terminal functionality;
   receiving, by the thin client, a plurality of communication messages from at least one of the remote computer or the portable device; and
   executing, by the thin client using the rules engine, a subset of the one or more actions to manage the processing flow for the communications between the portable device and the remote computer, wherein the subset of the one or more actions are identified by the rules engine based at least in part on the set of rules, the one or more actions comprising least one of: modifying a first message according to the set of rules, consolidating a second message and a third message according to the set of rules, or delaying a fourth message according to the set of rules.

2. The computer-implemented method of claim 1, wherein the portable device and the remote computer are configured to communicate in disparate communication protocols.

3. The computer-implemented method of claim 1, wherein executing the subset of the one or more actions causes the plurality of communication messages to be modified by the thin client to conform to a communications protocol associated with the remote computer.

4. The computer-implemented method of claim 1, wherein executing the subset of the one or more actions comprises modifying the first message according to the set of rules, and wherein modifying the first message comprises converting data of the first message from a first communications protocol to a second communications protocol.

5. The computer-implemented method of claim 4, wherein the first communications protocol is associated with the portable device and the second communications protocol is associated with the remote computer.

6. The computer-implemented method of claim 1, wherein the one or more actions can further comprise establishing a secure connection or executing a script.

7. The computer-implemented method of claim 1, wherein the rules engine further identifies one or more data fields to include in an outgoing message to be transmitted by the thin client, the one or more data fields being identified based at least in part on the one or more actions.

8. The computer-implemented method of claim 1, further comprising:
   receiving, by the thin client from the remote computer, an updated set of rules associated with transaction processing; and
   configuring the thin client according to the updated set of rules received, wherein configuring the thin client with the updated set of rules causes the thin client to manage subsequent processing flows between at least one portable device and the remote computer to be managed according to the updated set of rules.

9. The computer-implemented method of claim 8, further comprising:
   receiving, by the thin client, at least one additional communication message from the remote computer or the portable device; and
   executing, by the thin client using the rules engine, at least one additional action to manage the processing flow for the communications between the portable device and the remote computer, wherein the at least one additional action is identified by the rules engine based at least in part on the updated set of rules.

10. A thin client, comprising:
    a processor; and
    a computer readable medium coupled to the processor, the computer readable medium comprising code that, when executable by the processor, causes the thin client to:
    receive, from a remote computer by a rules engine executing at the thin client, a set of rules defining one or more actions to be executed in response to receiving one or more particular transaction messages, the thin client being communicatively disposed between the remote computer and a portable device and configured to manage a processing flow for communications between the portable device and the remote computer using the one or more actions, the remote computer being configured to provide point-of-sale terminal functionality;
    receive a plurality of communication messages from at least one of the remote computer or the portable device; and
    execute a subset of the one or more actions to manage the processing flow for the communications between the portable device and the remote computer, wherein the subset of the one or more actions are identified by the rules engine based at least in part on the set of rules, the one or more actions comprising least one of: modifying a first message according to the set of rules, consolidating a second message and a third message according to the set of rules, or delaying a fourth message according to the set of rules.

11. The thin client of claim 10, wherein the set of rules are received with configuration data from the remote computer, and wherein the thin client is configured to manage the processing flow for communications between the portable device and the remote computer using the one or more actions based at least in part on storing the set of rules received with the configuration data.

12. The thin client of claim 10, wherein the rules engine is configured to identify the subset of the one or more actions further based at least in part on a particular communication message received as part of the plurality of communication messages.

13. The thin client of claim 10, wherein receiving the plurality of communication messages from at least one of the remote computer or the portable device further comprises:
- receiving, from the remote computer, a first communication message of the plurality of communication messages;
- in accordance with the set of rules and in response to receiving the first communication message, transmit, to the portable device, a second communication message;
- receive, from the portable device, a third communication message;
- identify, by the rules engine executing on the thin client, an action based at least in part on receipt of the third communication message;
- transmit a fourth communication message to the portable device without communicating with the remote computer;
- receive a fifth communication message from the portable device; and
- in accordance with the set of rules and in response to receiving the fifth communication message, transmit the fifth communication message to the remote computer, wherein the first, second, third, fourth, and fifth communication messages facilitate processing of a transaction.

14. The thin client of claim 10, wherein identifying the subset of the one or more actions comprises interpreting, by the rules engine, at least a portion of the set of rules.

15. The thin client of claim 10, wherein receiving the plurality of communication messages from at least one of the remote computer or the portable device further comprises:
- receiving, from the remote computer, a first communication message of the plurality of communication messages;
- transmitting and receiving two or more communication messages of the plurality of communication messages, the two or more communication messages being communicated between the thin client and the portable device based at least in part on the thin client receiving the first communication message; and
- transmitting, to the remote computer, a second communication message comprising data obtained with the two or more communications messages communicated between the thin client and the portable device.

16. The thin client of claim 10, wherein receiving the plurality of communication messages from at least one of the remote computer or the portable device further comprises:
- receiving, from the remote computer, a first communication message of the plurality of communication messages;
- transmitting, to the portable device, a second communication message;
- receiving, from the portable device, a third communication message of the plurality of communication messages;
- determining, based at least in part on the set of rules, one or more data fields to include in a fourth communication message of the plurality of communication messages; and
- transmitting, to the remote computer, the one or more data fields in the fourth communication message.

17. The thin client of claim 10, wherein the thin client is further configured to establish a secure connection with the remote computer.

18. The thin client of claim 17, wherein the secure connection is associated with a first communications protocol associated with the remote computer.

19. The thin client of claim 18, wherein the portable device is associated with a second communications protocol different from the first communications protocol.

20. The thin client of claim 19, wherein the thin client does not establish an additional secure connection with the portable device in accordance with the second communications protocol.

* * * * *